(12) United States Patent
Yamamoto et al.

(10) Patent No.: US 10,753,449 B2
(45) Date of Patent: Aug. 25, 2020

(54) AXLE DRIVING DEVICE AND METHOD FOR ASSEMBLING AXLE DRIVING DEVICE

(71) Applicant: HONDA MOTOR CO., LTD., Tokyo (JP)

(72) Inventors: Eriko Yamamoto, Wako (JP); Takahiro Kasahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 16/275,705

(22) Filed: Feb. 14, 2019

(65) Prior Publication Data

US 2019/0293162 A1    Sep. 26, 2019

(30) Foreign Application Priority Data

Mar. 22, 2018  (JP) .................................. 2018-055043

(51) Int. Cl.
  *F16H 48/40*  (2012.01)
  *F16H 48/11*  (2012.01)
  *F16H 48/38*  (2012.01)

(52) U.S. Cl.
  CPC ............. *F16H 48/40* (2013.01); *F16H 48/11* (2013.01); *F16H 2048/382* (2013.01)

(58) Field of Classification Search
  None
  See application file for complete search history.

(56) References Cited

U.S. PATENT DOCUMENTS

| 2015/0111685 A1* | 4/2015 | Biermann | ............ F16C 17/107 |
| | | | 475/248 |
| 2019/0211908 A1* | 7/2019 | Voelkel | ................. F16H 57/082 |
| 2019/0293159 A1* | 9/2019 | Yamamoto | ............... B60K 1/00 |

FOREIGN PATENT DOCUMENTS

| DE | 102013205432 A1 * | 10/2014 | ............. F16H 48/11 |
| DE | 102013206734 A1 * | 10/2014 | ........... F16H 57/082 |
| DE | 102016216784 A1 * | 3/2018 | ........... F16H 37/082 |
| JP | 2009-036365 | 2/2009 | |
| WO | WO-2012014634 A1 * | 2/2012 | ............... F16H 1/28 |

* cited by examiner

*Primary Examiner* — Dirk Wright
(74) *Attorney, Agent, or Firm* — Rankin, Hill & Clark LLP

(57) ABSTRACT

It is an object to provide an axle driving device that can change a deceleration ratio while obtaining a high deceleration ratio, and reduces noise during operation to have high ease of assembly and coolability. A carrier of a planet gear mechanism includes a first plate-like member, a second plate-like member, and a third plate-like member, and the third plate-like member includes the plate-like portion and the second plate-like member, a plurality of stays extended from the plate-like portion and connected to the first plate-like member, and a plurality of stays extended from the plate-like portion and connected to the second plate-like member.

4 Claims, 13 Drawing Sheets

AXLE DRIVING DEVICE AND METHOD FOR ASSEMBLING AXLE DRIVING DEVICE

CROSS-REFERENCE TO RELATED APPLICATION

The present application claims priority under 35 U.S.C. § 119 to Japanese Patent Application No. 2018-055043 filed on Mar. 22, 2018, the entire contents of which are hereby incorporated by reference.

BACKGROUND OF THE INVENTION

Field of the Invention

The present disclosure relates to an axle driving device and a method for assembling an axle driving device.

Description of the Related Art

Among axle driving devices using electric motors, one is known in which motive power of the electric motor is decelerated with a deceleration mechanism and is then transmitted to an output shaft. There is known a planet gear mechanism that is formed by stacking a plurality of planet gear units so as to obtain a high deceleration ratio.

There is also known a method for stacking planet gear units in multiple stages along an output shaft so as to obtain an even higher deceleration ratio.

Further, as illustrated in Japanese Patent Laid-Open No. 2009-36365, a device using a two-stage gear for the planet gear mechanism is known.

SUMMARY OF THE INVENTION

However, in the device where the planet gear units are stacked in multiple stages along the output shaft in the planet gear mechanism so as to obtain a high deceleration ratio, the number of parts increases while a plurality of carriers are required, thereby increasing labor for assembly. Further, the stacking causes an increase in assembly deviation among the planet gear units, and noise tends to be generated.

Also in the device illustrated in Japanese Patent Laid-Open No. 2009-36365, the shape of the carrier in the planet gear mechanism is complex and a lot of labor is required for producing the carrier. In addition, a support shaft of the planet gear is supported only on one side, so the supporting rigidity of the planet gear is difficult to increase, and noise tends to be generated due to deviation between the gears.

Further, in the planet gear mechanism using a two-stage gear, as the one illustrated in Japanese Patent Laid-Open No. 2009-36365, a large gear of the two-stage gear prevents an engaged gear from being viewed. Hence a lot of labor is required for assembly of the planet gear mechanism.

In view of the conventional disadvantage described above, it is an object of the present disclosure to provide an axle driving device that improves rigidity of a carrier of a planet gear mechanism to reduce noise during operation. It is also an object of the present disclosure to facilitate assembly of a gear to the carrier of the planet gear mechanism.

In addition, the conventional variable speed planet gear mechanism is complex, and for supplying lubricating oil to the gear in such a complex planet gear mechanism, a further complex configuration is required. Hence the configuration to cool the gear of the planet gear mechanism with lubricating oil becomes complex, and a lot of labor is required for the assembly.

In view of the conventional disadvantage described above, it is an object of the present disclosure to provide an axle driving device capable of changing a deceleration ratio while obtaining a high deceleration ratio.

It is also an object of the present disclosure to provide an axle driving device that reduces noise during operation and has high ease of assembly and coolability.

The present disclosure includes a planet gear mechanism configured to transmit a driving force to a first axle and a second axle via a differential mechanism, a carrier of the planet gear mechanism includes a first plate-like member, a second plate-like member, and a third plate-like member that connects the first plate-like member and the second plate-like member, and the third plate-like member includes a base plate orthogonal to a rotary shaft of the carrier and located between the first plate-like member and the second plate-like member, a plurality of stays extended from the base plate and connected to the first plate-like member, and a plurality of stays extended from the base plate and connected to the second plate-like member.

With this configuration, in the carrier, the stay connecting the third plate-like member and the first plate-like member and the stay connecting the third plate-like member and the second plate-like member can be made shorter than the distance between the first plate-like member and the third plate-like member. This enables improvement in rigidity of the carrier.

Further, in the present disclosure, the third plate-like member may be molded by folding the stays connected to the first plate-like member and the stays connected to the second plate-like member to the base plate by press working, and the stays connected to the first plate-like member and the stays connected to the second plate-like member may be fixed by welding.

With this configuration, it is possible to easily mold the third plate-like member by press working and reduce manufacturing cost of the carrier.

Further, in the present disclosure, at least one of support shafts of planetary gears held by the carrier may be a stepped shaft having a small diameter part, and the small diameter part may be exposed between the first plate-like member or the second plate-like member and the third plate-like member.

With this configuration, it is possible to provide a space around the small diameter part.

Further, the present disclosure is one in which a carrier of the planet gear mechanism includes a first plate-like member, a second plate-like member, and a third plate-like member that connects the first plate-like member and the second plate-like member, and the third plate-like member is orthogonal to a rotary shaft of the carrier and located between the first plate-like member and the second plate-like member, and includes an annular part provided in an annular shape about the rotary shaft, and a plurality of extensions extended from the annular part to the outside and arranged at equal intervals in a circumferential direction about the rotary shaft, the present disclosure including the steps of: attaching a first stepped gear between the extensions, with a smaller gear of the first stepped gear facing the first plate-like member; attaching a first planetary gear between the first plate-like member and the third plate-like member while causing the first planetary gear to mesh with a larger gear of the first stepped gear; attaching a second stepped gear between the extensions while causing the smaller gear of the second stepped gear to mesh with a larger gear of the first stepped gear; and attaching a second planetary gear between the second plate-like member and the third plate-like member while causing the second planetary gear to mesh with a smaller gear of the first stepped gear.

With this configuration, at the time of assembling the gear to the carrier, the gear can be easily assembled by considering meshing with one gear.

Advantageous Effects of Invention

According to the axle driving device in the present disclosure, it is possible to provide the axle driving device that improves the supporting rigidity of the planet gear in the carrier of the planetary deceleration mechanism to reduce noise during operation. Further, it is possible to facilitate assembly of the gear to the carrier.

According to the method for assembling the planetary deceleration mechanism in the present disclosure, the planetary gear can be easily assembled to the carrier.

DETAILED DESCRIPTION OF THE PREFERRED EMBODIMENTS

Hereinafter, an embodiment of the present disclosure will be described with reference to the drawings.

An axle driving device 1 according to the embodiment of the present disclosure will be described with reference to FIGS. 1 to 12.

Figure 1:
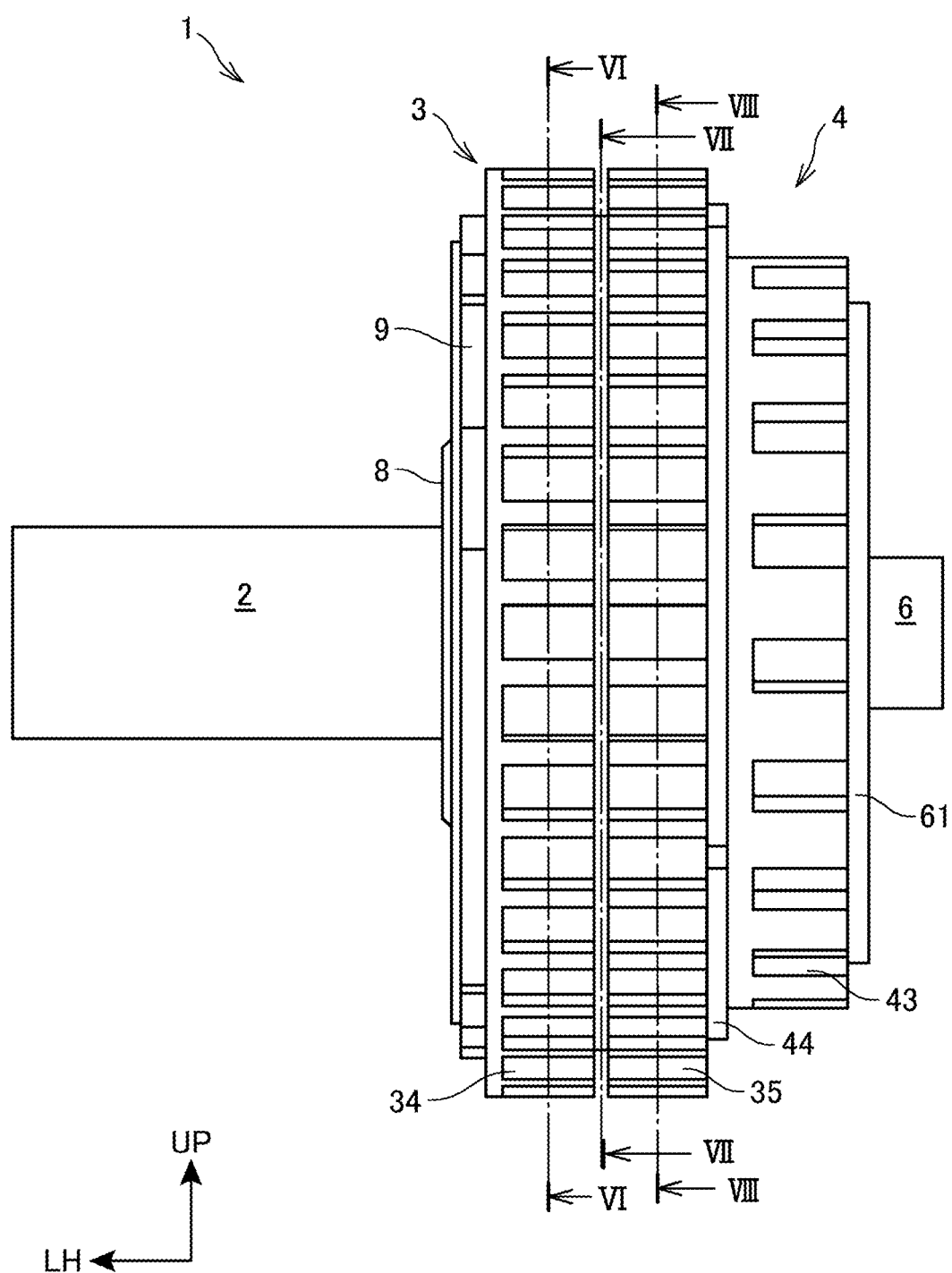
FIG. 1 is a front view illustrating an axle driving device according to the present disclosure.
Figure 2:
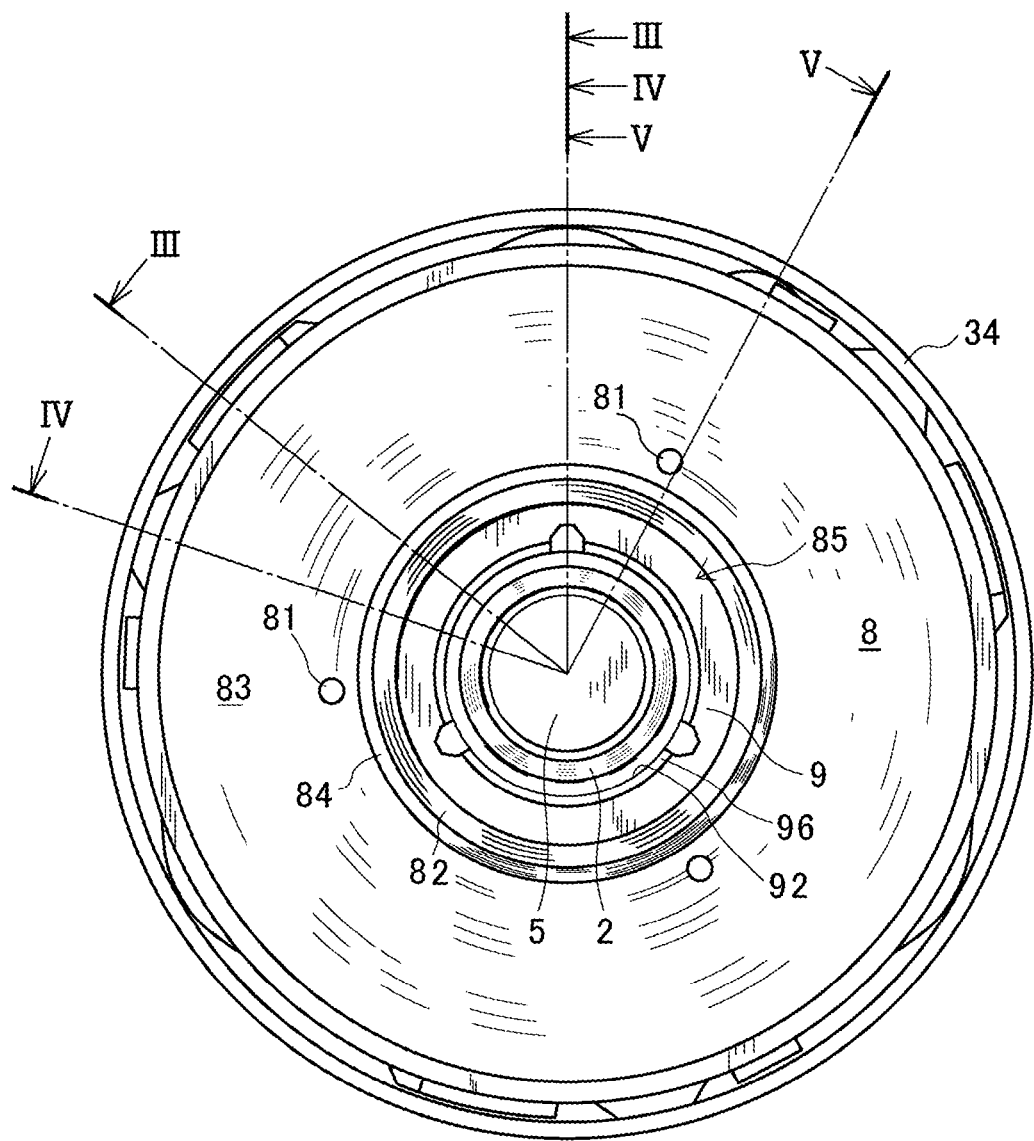
FIG. 2 is a left side view of the axle driving device.
Figure 2:
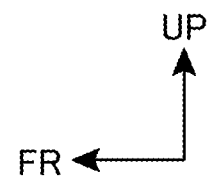
Figure 3:
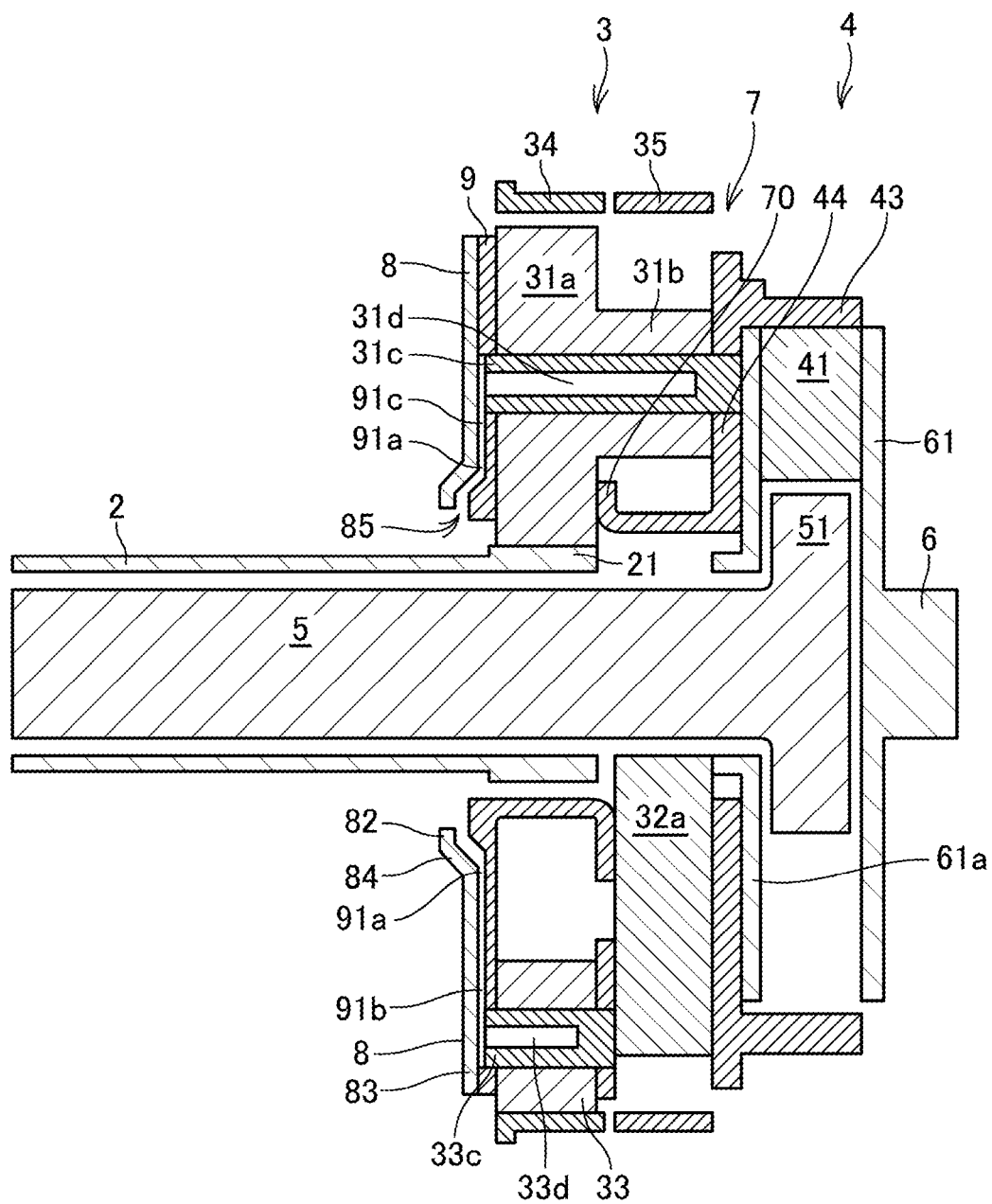
FIG. 3 is a sectional view along a line III-III in FIG. 2.
Figure 4:
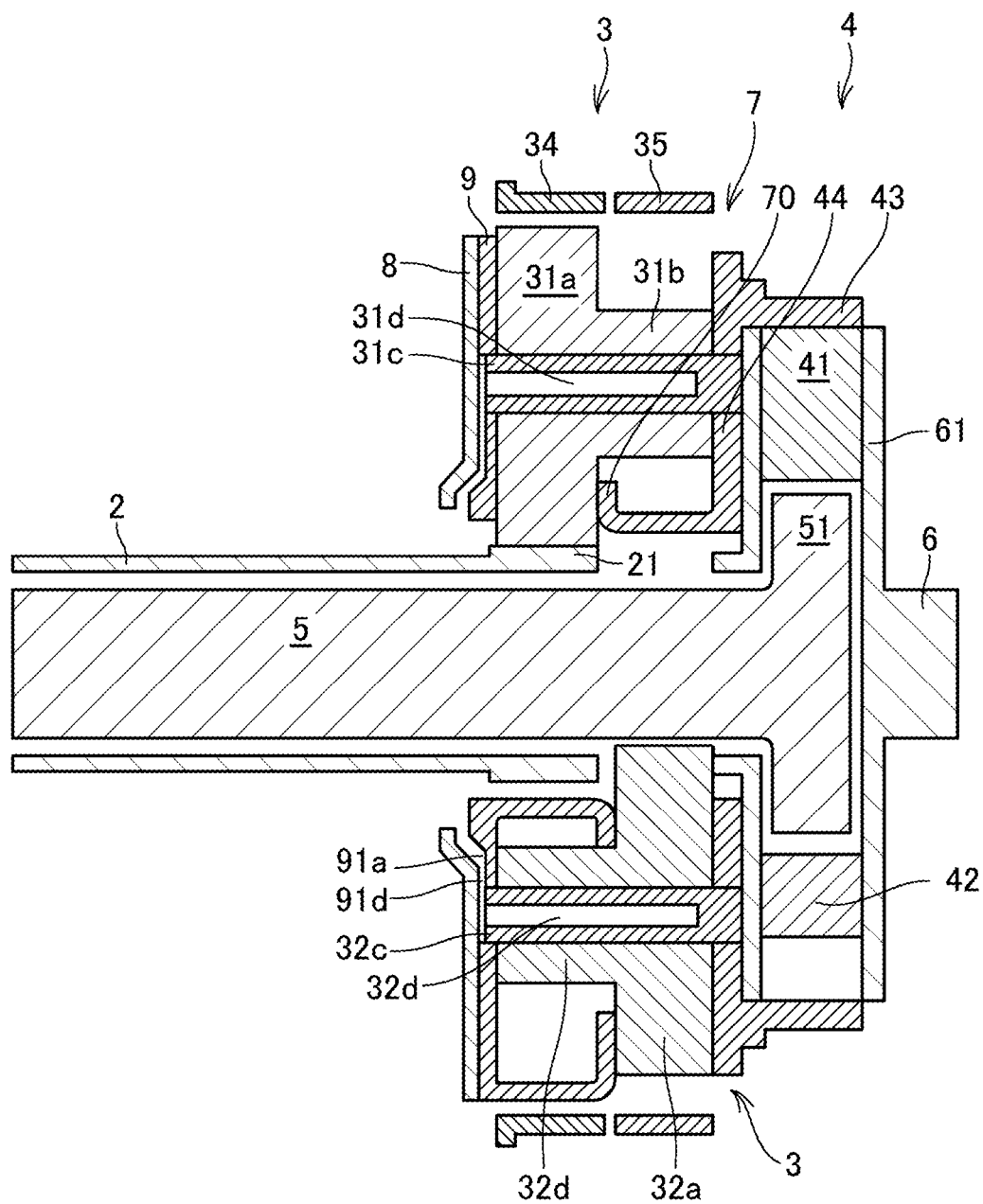
FIG. 4 is a sectional view along a line IV-IV in FIG. 2.
Figure 5:
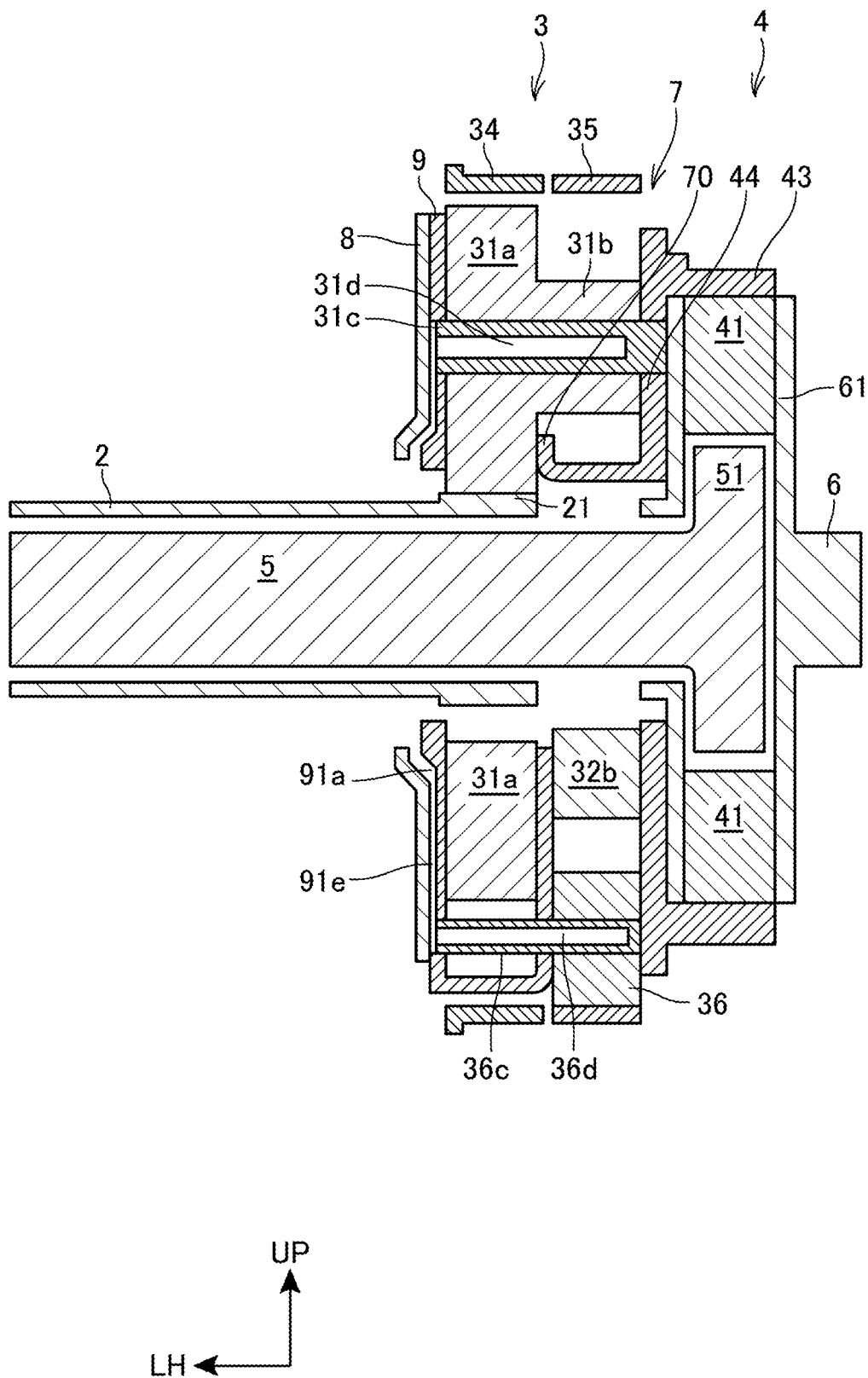
FIG. 5 is a sectional view along a line V-V in FIG. 2.
Figure 6:
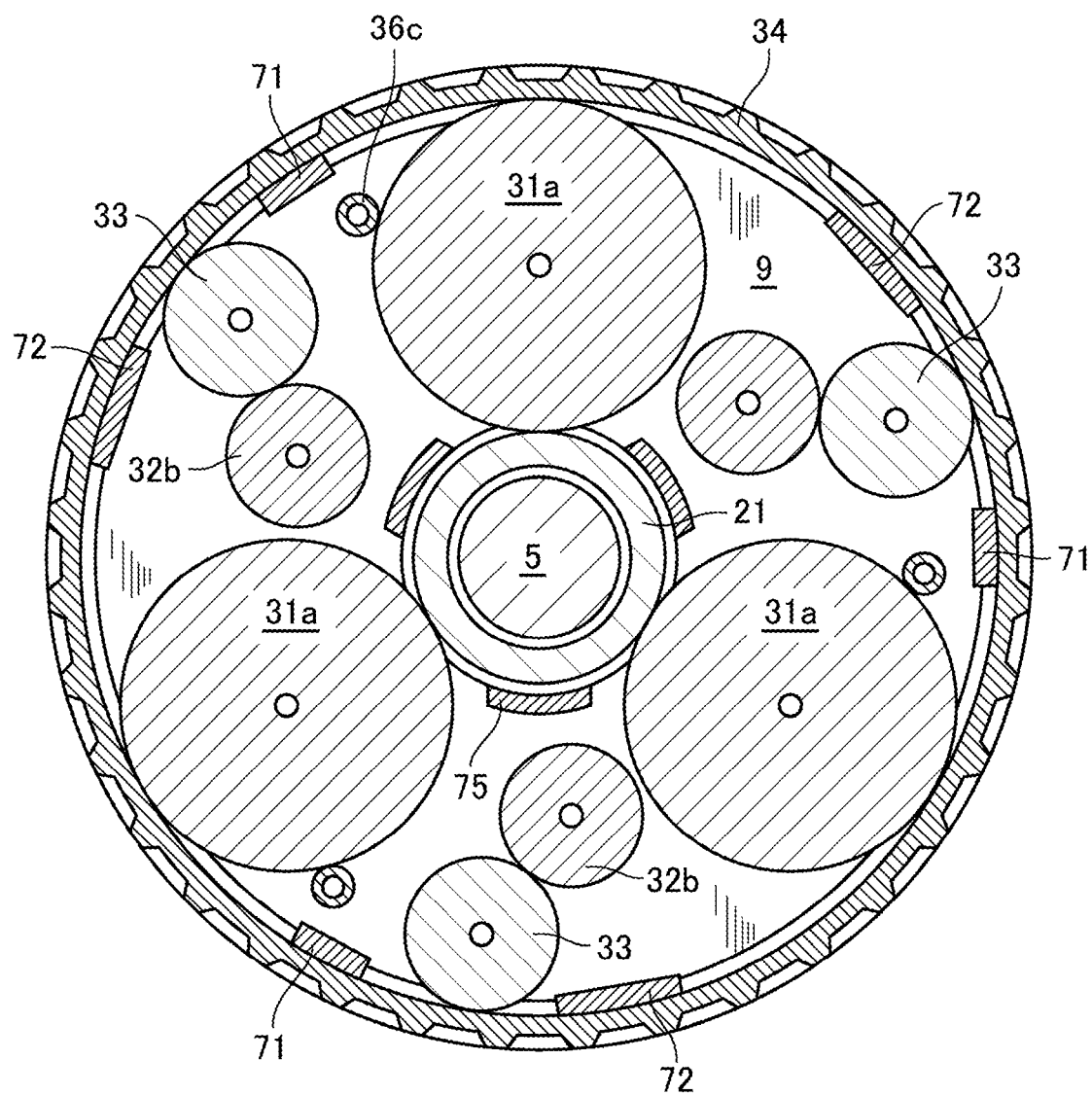
FIG. 6 is a sectional view along a line VI-VI in FIG. 1.
Figure 6:
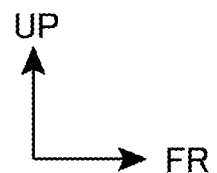

FIG. 1 is a front view illustrating an axle driving device according to the present disclosure, and FIG. 2 is a left side view of the axle driving device. FIG. 3 is a sectional view along a line III-III in FIG. 2, and FIG. 4 is a sectional view along a line IV-IV in FIG. 2. FIG. 5 is a sectional view along a line V-V in FIG. 2, and FIG. 6 is a sectional view along a line IV-IV in FIG. 1.

Figure 7:
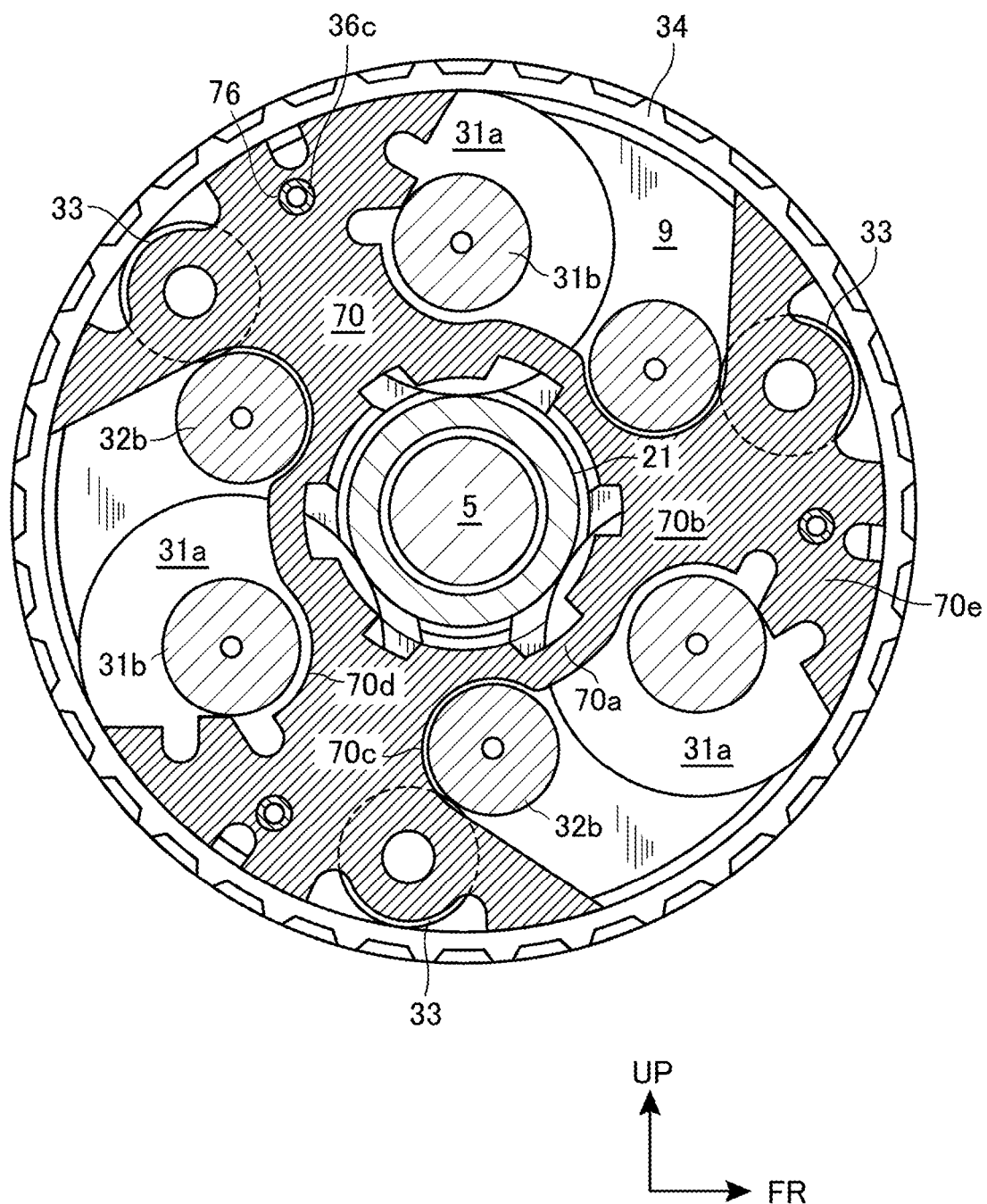
FIG. 7 is a sectional view along a line VII-VII in FIG. 1.
Figure 8:
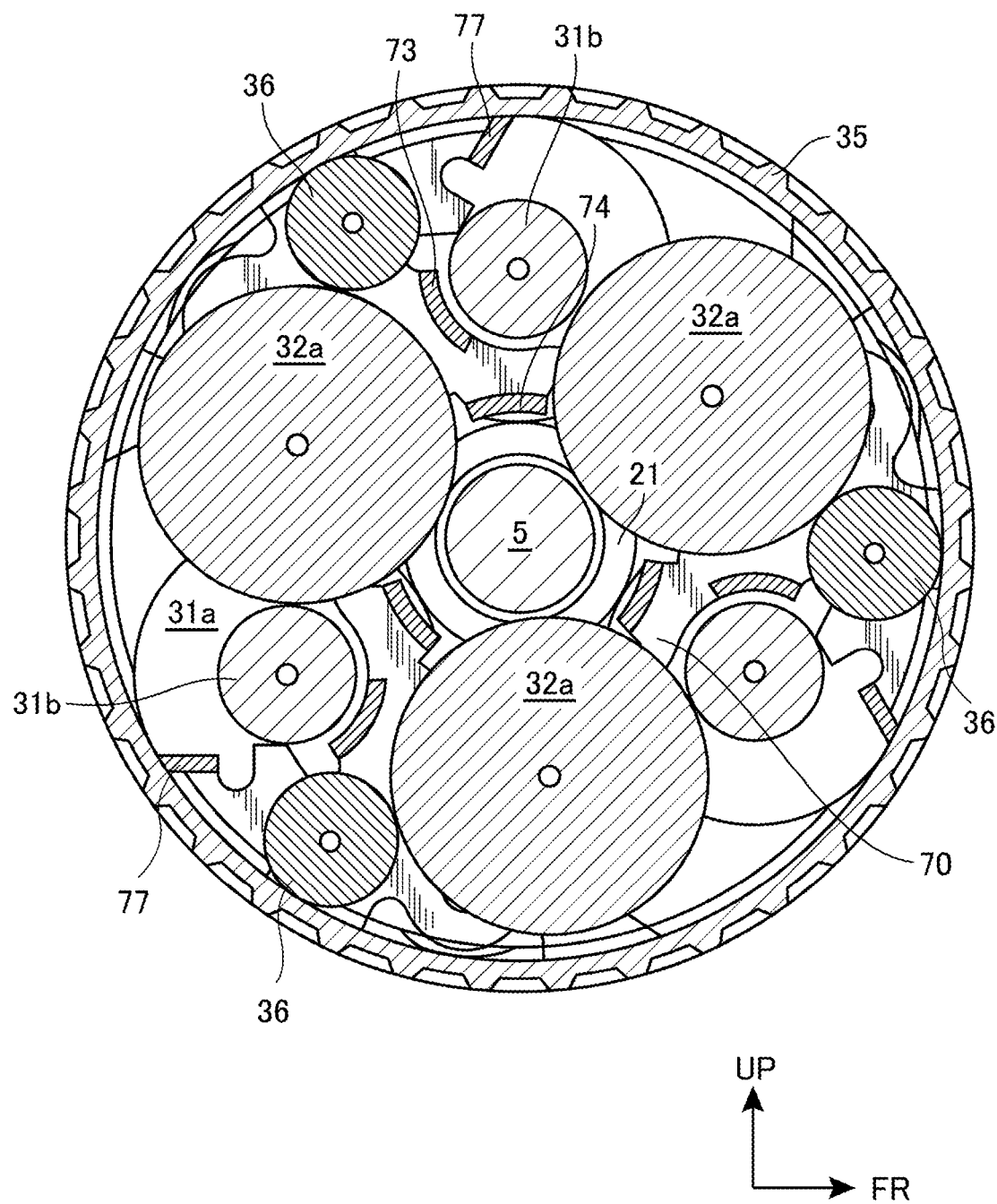
FIG. 8 is a sectional view along a line VIII-VIII in FIG. 1.
Figure 9:
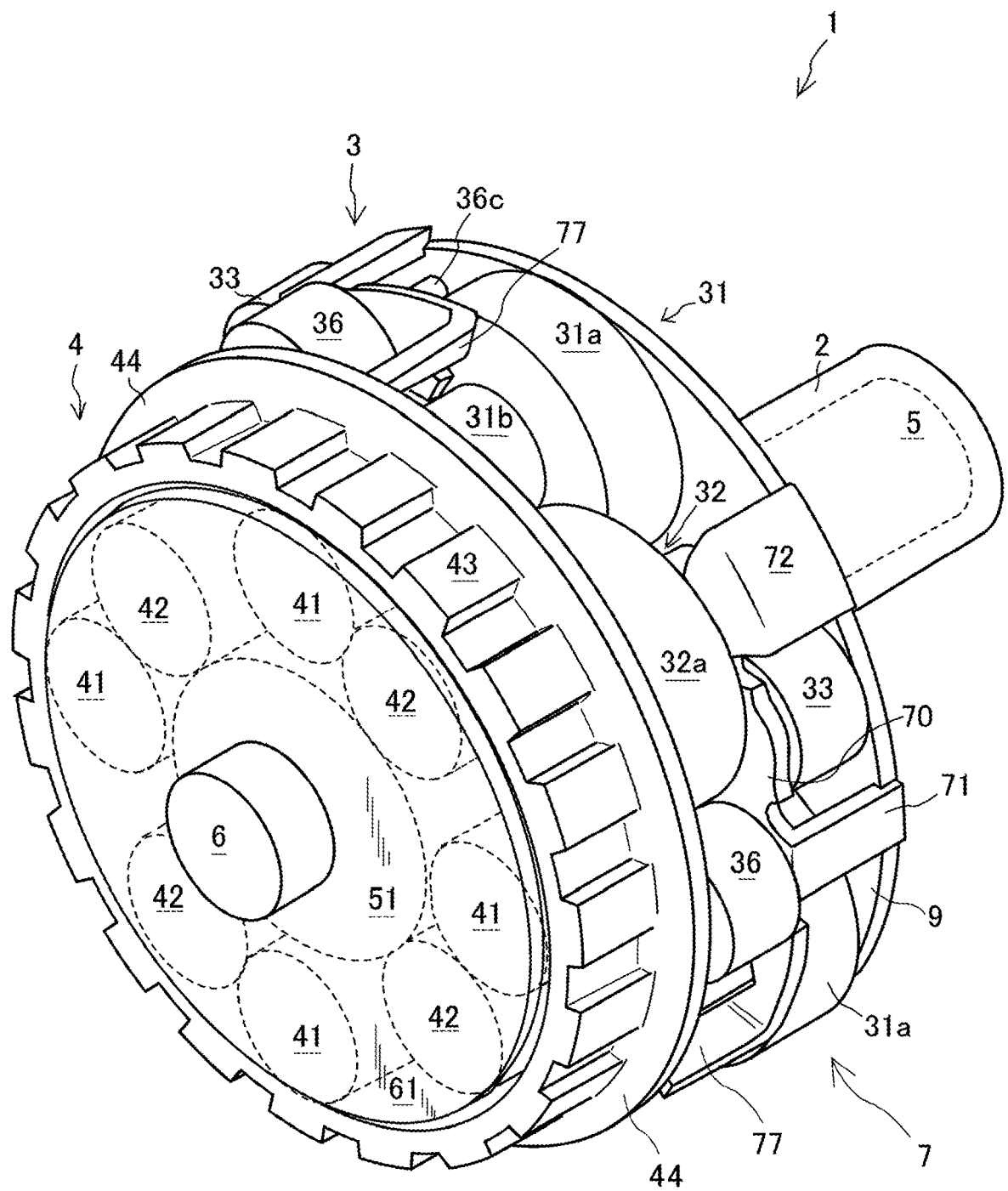
FIG. 9 is a perspective view illustrating the right side of the axle driving device.
Figure 9:
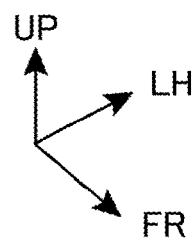
Figure 10:
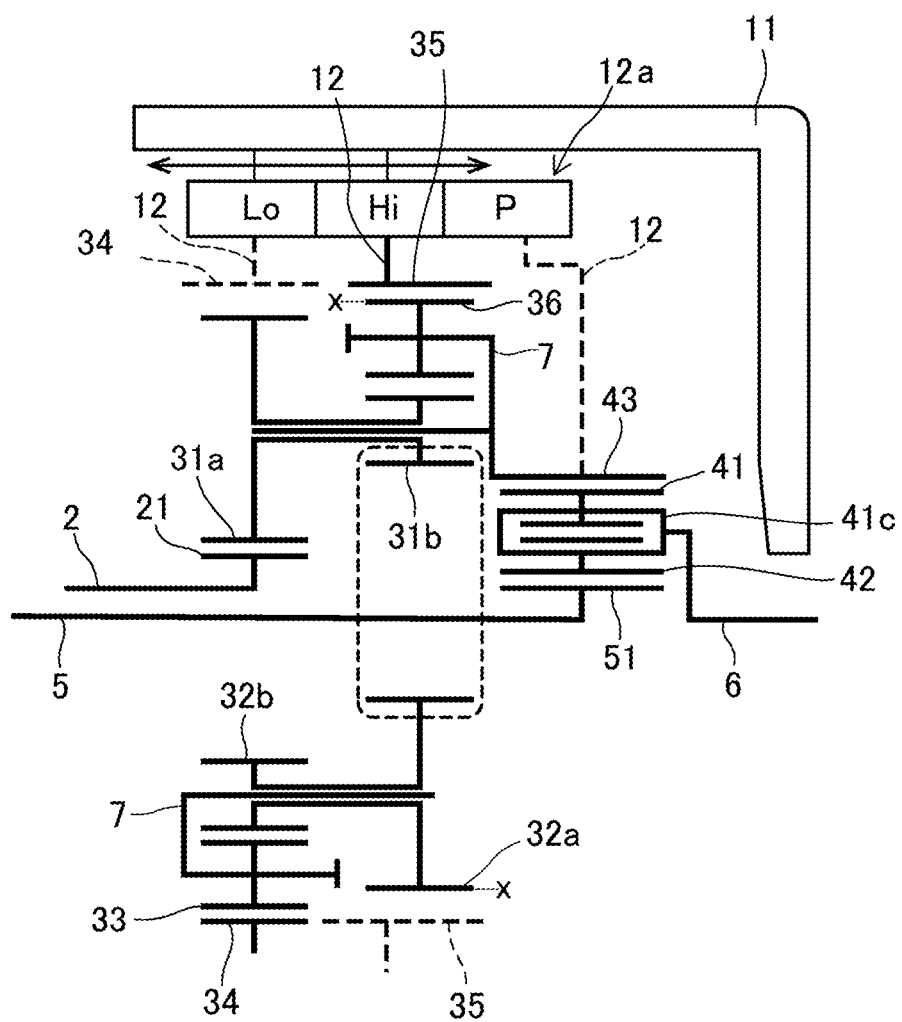
FIG. 10 is a skeleton view illustrating a configuration of the axle driving device.
Figure 11:
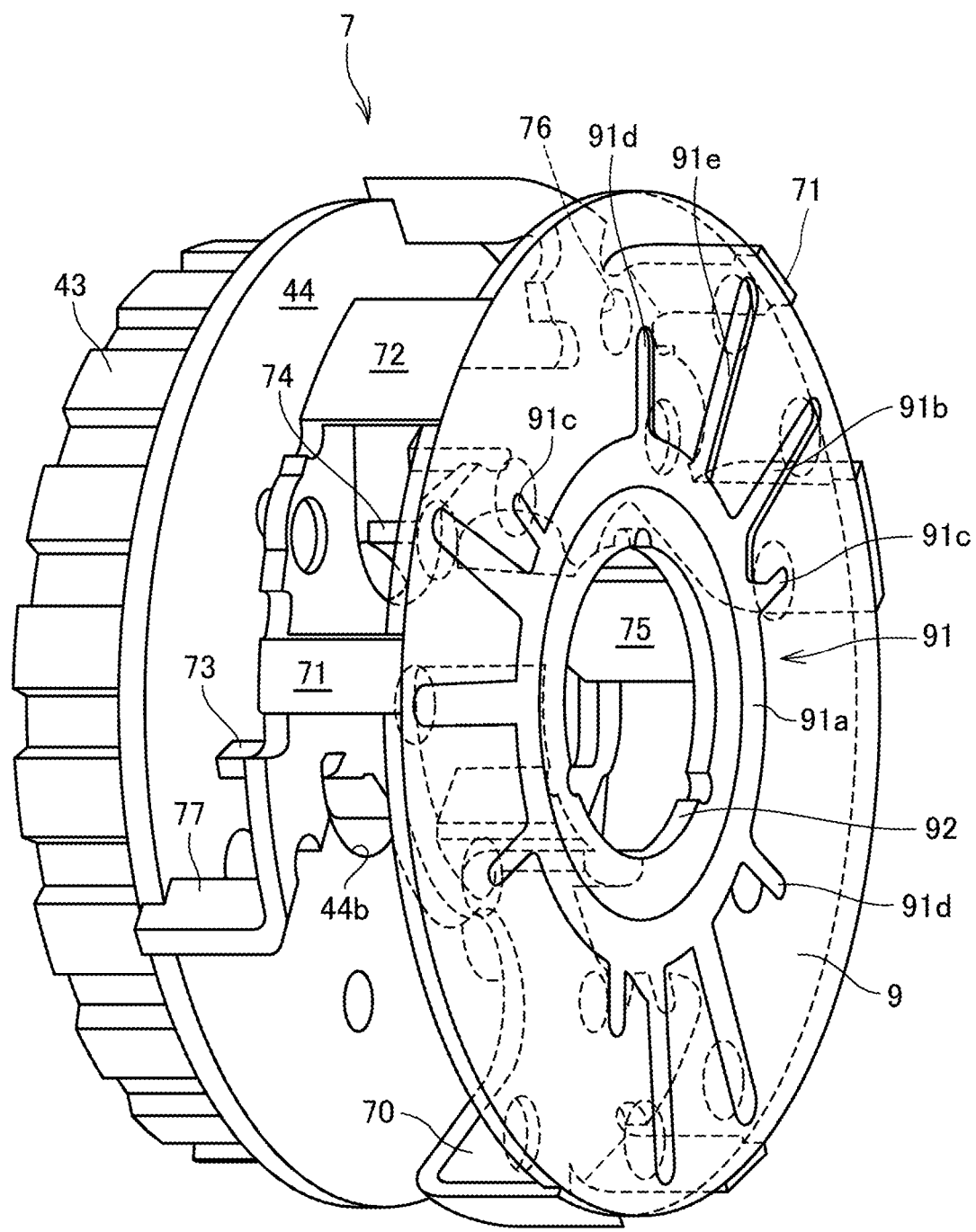
FIG. 11 is a perspective view illustrating a configuration of a carrier.
Figure 12:
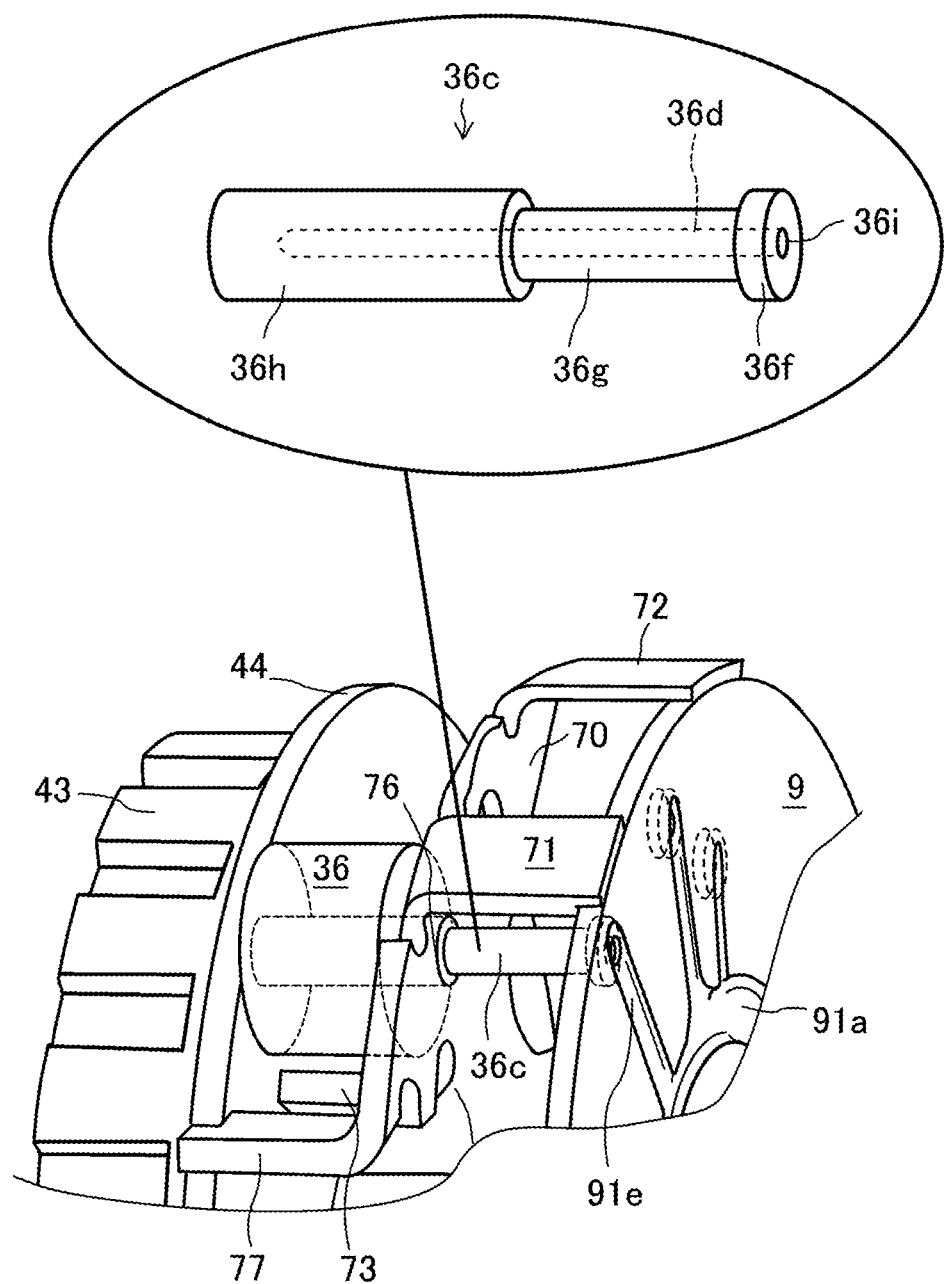
FIG. 12 is a partial enlarged view illustrating an assembly configuration of a second outer pinion.

FIG. 7 is a sectional view along a line VII-VII in FIG. 1, and FIG. 8 is a sectional view along a line VIII-VIII in FIG. 1. FIG. 9 is a perspective view illustrating the right side of the axle driving device, and FIG. 10 is a skeleton view illustrating a configuration of the axle driving device. FIG. 11 is a perspective view illustrating a configuration of a carrier, and FIG. 12 is a partial enlarged view illustrating an assembly configuration of a second outer pinion.

Note that symbols FR in each drawing denotes the front side of a vehicle body, symbol UP denotes the upper side of the vehicle body, and symbol LH denotes the left side of the vehicle body.

The axle driving device 1 is covered with a housing case 11 and attached to the vehicle, and receives input of a driving force from an electric motor (not illustrated).

The axle driving device 1 includes a planet gear mechanism 3, which is a planetary deceleration mechanism, and a differential mechanism 4 and is connected to a first axle 5 on the left side and connected with a second axle 6 on the right side. For a gear of each of the planet gear mechanism 3 and the differential mechanism 4, a gear that transmits a driving force between parallel shafts is used, and a spur gear or a helical gear can be used.

A motor driving shaft 2 being a driving-force input shaft is connected to the axle driving device 1, and a driving force is input into the axle driving device 1.

The driving force input from the motor driving shaft 2 is decelerated by the planet gear mechanism 3 and is output to the first axle 5 and the second axle 6 via the differential mechanism 4.

Note that a first ring gear 34 and a second ring gear 35, which are internal gears, are provided in the planet gear mechanism 3 of the axle driving device 1. The first ring gear 34 and the second ring gear 35 are fixable by an engagement unit 12 to the housing case 11 that covers the axle driving device 1. Hence the first ring gear 34 or the second ring gear 35 is fixable to the body of the axle driving device 1.

Fixing of either the first ring gear 34 or the second ring gear 35 enables a change in deceleration ratio of the driving force that is output to the differential mechanism 4.

Further, the differential mechanism 4 can also be fixed by the engagement unit 12 to the housing case 11 covering the axle driving device 1, and fixed to the body of the axle driving device 1. When the differential mechanism 4 is fixed, the driving force is not transmitted from the motor driving shaft 2 to the first axle 5 or the second axle 6.

As illustrated in FIGS. 2 and 3, the motor driving shaft 2 is a horizontally extending hollow shaft, on the inside of which, the first axle 5 is inserted. A rotor of the electric motor can be attached to the outer peripheral surface of the motor driving shaft 2. It is thereby possible to drive the motor driving shaft 2 directly and output the driving force from the first axle 5 provided through the motor driving shaft 2.

Note that the driving force can also be input into the motor driving shaft 2 by another configuration of the input via a gear, a belt, or the like.

Next, the internal configuration of the axle driving device 1 will be specifically described with reference to FIGS. 3 to 8.

The axle driving device 1 includes the planet gear mechanism 3. The planet gear mechanism 3 is made up of a sun gear 21 provided at one end of the motor driving shaft 2, a first stepped pinion 31, a second stepped pinion 32, a first outer pinion 33, a first ring gear 34, a second outer pinion 36, a second ring gear 35, and a carrier 7.

The first stepped pinion 31, the second stepped pinion 32, the first outer pinion 33, and the second outer pinion 36 are planetary gears.

Three each of the first stepped pinions 31, the second stepped pinions 32, the first outer pinions 33, and the second outer pinions 36 are arranged at equal intervals around the motor driving shaft 2.

Further, the carrier 7 is made up of a side plate 9 and a differential case 44 which are integrally fixed via a base plate 70 and stays. As illustrated in FIG. 2, a cover plate 8 is attached to the side plate 9 with three fastening points 81.

Note that the stays are made up of three each of first stays 71, second stays 72, third stays 73, fourth stays 74, fifth stays 75, and sixth stays 77.

The side plate 9 and the differential case 44 are both made of a plate-like member. In addition, the base plate 70, the first stay 71, the second stay 72, the third stay 73, the fourth stay 74, the fifth stay 75, and the sixth stay 77 are integrally configured and constitute a plate-like member connecting the side plate 9 and the differential case 44.

The carrier 7 turnably supports the first stepped pinion 31, the second stepped pinion 32, the first outer pinion 33, and the second outer pinion 36. Then, rotary shafts of the first stepped pinion 31, the second stepped pinion 32, the first outer pinion 33, and the second outer pinion 36 are arranged parallel to the motor driving shaft 2.

As illustrated in FIGS. 2 and 6, the sun gear 21 is a gear with its teeth facing the outside of the motor driving shaft 2, and rotates integrally with the motor driving shaft 2. The sun gear 21 meshes with a large gear 31a of the first stepped pinion 31.

The first stepped pinion 31 includes the large gear 31a and a small gear 31b that rotate integrally. The first stepped pinion 31 is rotatably supported by a support shaft 31c supported by the side plate 9 and the differential case 44.

When a driving force is transmitted from the sun gear 21, the large gear 31a of the first stepped pinion 31 rotates integrally with the small gear 31b. The driving force is then transmitted from the small gear 31b to a large gear 32a of the second stepped pinion 32.

Note that the large gear 31a of the first stepped pinion 31 is disposed on the left side which is the side plate 9 side, and the small gear 31b is disposed on the right side which is the differential case 44 side.

As illustrated in FIG. 8, the large gear 32a of the second stepped pinion 32 meshes with the second outer pinion 36. The second outer pinion 36 is disposed between the base plate 70 and the differential case 44. The second outer pinion 36 meshes with internal teeth of the second ring gear 35 inside the second ring gear 35.

Note that the second outer pinion 36 is disposed in a position where the second outer pinion 36 overlaps with the large gear 31a of the first stepped pinion 31 in a horizontal view of the axle driving device 1.

A support shaft 36c of the second outer pinion 36 is provided through the base plate 70 and has the ends respectively supported by the side plate 9 and the differential case 44. The second outer pinion 36 is rotatably supported by the support shaft 36c.

Thereby, the driving force input into the first stepped pinion 31 is transmitted to the second outer pinion 36 via the second stepped pinion 32.

As illustrated in FIGS. 11 and 12, the base plate 70 is provided with a support hole 76, into which the support shaft 36c of the second outer pinion 36 is inserted. The support shaft 36c has both ends supported by the side plate 9 and the differential case 44, while being inserted in the support hole 76.

Further, as illustrated in FIG. 12, the support shaft 36c includes a head 36f, a small diameter part 36g, and a large diameter part 36h. The large diameter part 36h has one end held by the differential case 44 and is inserted in the second outer pinion 36 Further, the head 36f side of the large diameter part 36h is inserted in the support hole 76 of the base plate 70. The small diameter part 36g is connected to the large diameter part 36h, and the small diameter part 36g is configured to have a diameter smaller than that of the large diameter part 36h.

The small diameter part 36g is disposed between the base plate 70 and the side plate 9 and exposed from the carrier 7. As illustrated in FIG. 6, the large gear 31a of the first stepped pinion 31 is disposed in the vicinity of the support shaft 36c between the base plate 70 and the side plate 9. Therefore, by providing the small diameter part 36g on the support shaft 36c, the interference between the support shaft 36c and the large gear 31a is avoided.

The head 36f is connected to the small diameter part 36g, and the head 36f is inserted in the side plate 9 and held therein. An opening 36i is provided on the end face of the head 36f, and the opening 36i is connected to a lubricating oil passage 36d provided in the support shaft 36c.

As illustrated in FIG. 12, the support shaft 36c is inserted in the side plate 9, and the opening 36i is connected to the end of an oil passage 91e of the side plate 9. Hence the oil passage 91e is connected to the lubricating oil passage 36d via the opening 36i.

The lubricating oil passage 36d is provided in an area from the opening 36i to a middle part of the large diameter part 36h inserted in the second outer pinion 36. The lubricating oil passage 36d is connected to an oil passage (not illustrated) that communicates the lubricating oil passage 36d, provided in the large diameter part 36h, and the outer peripheral surface of the large diameter part 36h.

In the second ring gear 35 meshing with the second outer pinion 36, the engagement unit 12 is provided so as to be engageable with the second ring gear 35. The engagement unit 12 is also provided so as to be engageable with the first ring gear 34 and the ring gear 43 of the differential mechanism 4. As illustrated in FIG. 10, the engagement unit 12 is provided movably in the direction of the rotary shaft of the second ring gear 35 in the housing case 11. The engagement unit 12 is positioned at a position Lo, Hi, or P by using a position selection unit 12a.

The engagement unit 12 is engaged with the second ring gear 35 when positioned at the position Hi, and the engagement unit 12 is engaged with the first ring gear 34 when positioned at the position Lo.

The engagement unit 12 is engaged with the ring gear 43 when positioned at the position P.

Note that the engagement unit 12 is only movable in the direction of the rotary shaft of the second ring gear 35. When engaged with the engagement unit 12, the first ring gear 34, the second ring gear 35, and the ring gear 43 are fixed to the housing case 11.

As illustrated in FIGS. 4 and 8, the second stepped pinion 32 is made up of the large gear 32a and a small gear 32b that integrally rotate, and the second stepped pinion 32 meshes with the first stepped pinion 31 via the large gear 32a.

The second stepped pinion 32 is rotatably supported by a support shaft 32c supported by the side plate 9 and the differential case 44. Note that the large gear 32a of the second stepped pinion 32 is disposed on the differential case 44 side, and the small gear 32b is disposed on the side plate 9 side.

As illustrated in FIGS. 3 and 6, the small gear 32b of the second stepped pinion 32 meshes with the first outer pinion 33. The first outer pinion 33 is disposed between the side plate 9 and the base plate 70.

A support shaft 33c of the first outer pinion 33 has ends supported by the side plate 9 and the base plate 70, and the first outer pinion 33 is supported rotatably.

As illustrated in FIG. 3, the support shaft 33c of the first outer pinion 33 is disposed in a position where the support shaft 33c overlaps with the large gear 32a of the second stepped pinion 32 in the horizontal view of the axle driving device 1.

Note that the base plate 70 is disposed between the side plate 9 and the differential case 44. The base plate 70 is disposed between the large gear 31a of the first stepped pinion 31 and the large gear 32a of the second stepped pinion 32 in the horizontal direction of the axle driving device 1.

Further, the support shaft 33c of the first outer pinion 33 is disposed on the outside of the support shaft 32c of the second stepped pinion 32 about the rotary shaft of the carrier 7.

As illustrated in FIGS. 6 and 9, the first stay 71 and the second stay 72, extended from the base plate 70, are arranged in the vicinity of the first outer pinion 33. The first outer pinion 33 is disposed between the first stay 71 and the second stay 72 in a turning direction of the side plate 9. The first outer pinion 33, the first stay 71, and the second stay 72 are arranged with an interval corresponding to a gear clearance of the first outer pinion 33.

The first outer pinion 33 meshes with internal teeth of the first ring gear 34 inside the first ring gear 34.

As illustrated in FIGS. 3 and 6, the first ring gear 34 is disposed on the side plate 9 side between the side plate 9 and the differential case 44. The large gear 31a of the first stepped pinion 31, the small gear 32b of the second stepped pinion 32, the sun gear 21, and the first outer pinion 33 are arranged inside the first ring gear 34.

The large gear 32a of the second stepped pinion 32 is offset with respect to the first ring gear 34 in the horizontal direction of the axle driving device 1. Further, as illustrated in FIGS. 4 and 8, the large gear 32a of the second stepped pinion 32 is offset with respect to the sun gear 21 in the horizontal direction of the axle driving device 1. It is configured that a tooth top of the large gear 32a passes through the inside of the tooth end of the sun gear 21 (the side of the large gear 32a which approaches a revolving axis).

The carrier 7 is rotatably configured around the motor driving shaft 2 as a rotary shaft. The first stepped pinion 31, the second stepped pinion 32, the first outer pinion 33, and the second outer pinion 36, which are supported by the carrier 7, can make a revolving motion with respect to the motor driving shaft 2.

When the first ring gear 34 is fixed to the axle driving device 1, the carrier 7 supporting the first outer pinion 33 turns by a driving force via the first outer pinion 33.

When the second ring gear 35 is fixed to the axle driving device 1, the carrier 7 turns by a driving force via the second outer pinion 36.

The carrier 7 is connected to the differential mechanism 4 by the differential case 44. The differential case 44 is made of the member in common with the carrier 7 and the differential mechanism 4. A driving force from the carrier 7 is thereby transmitted to the differential mechanism 4.

As illustrated in FIGS. 4 and 10, the differential mechanism 4 is made up of the differential case 44, the ring gear 43, a first pinion gear 41, a second pinion gear 42, a support plate 61, and the first axle 5. The rotating center of the differential case 44, the ring gear 43, and the support plate 61 coincides with the rotating center of the first axle 5.

The ring gear 43 is fixed to the differential case 44, and the first pinion gear 41, the second pinion gear 42, and a gear 51 of the first axle 5 are arranged inside the ring gear 43. The ring gear 43 is configured such that the engagement unit 12 is engageable therewith, and the ring gear 43 is fixable to the housing case 11 with the engagement unit 12.

As illustrated in FIG. 10, the ring gear 43 of the differential mechanism 4 meshes with the first pinion gear 41, and the first pinion gear 41 is rotatably supported by a support shaft 41c. The support shaft 41c of the first pinion gear 41 has its end held by the support plate 61 and an extension 61a extended from the support plate 61.

The first pinion gear 41 further meshes with the second pinion gear 42. Similarly to the first pinion gear 41, the second pinion gear 42 is rotatably held by a support shaft (not illustrated) held by the support plate 61 and the extension 61a. Rotary shafts of the first pinion gear 41 and the second pinion gear 42 are arranged in the horizontal direction of the axle driving device 1.

The second pinion gear 42 meshes with the gear 51 of the first axle 5.

Further, the second axle 6 is connected to the opposite side of the support plate 61 from the first axle 5.

The support plate 61 has the same rotary shaft as the second axle 6.

Hence a driving force is transmitted to the first axle 5 and the second axle 6 via the differential mechanism 4.

Next, the configuration of the carrier 7 will be described with reference to the sectional views of FIGS. 6 to 8 and the perspective view of FIG. 9.

The carrier 7 is formed by integral connection of the side plate 9 and the differential case 44 by the base plate 70. The side plate 9 has a disk shape and located on a plane orthogonal to the rotary shaft of the carrier 7, and the differential case 44 also has a similar shape. The base plate 70 has a plate-like portion located on the plane orthogonal to the rotary shaft, and a plate-like portion extending in the direction of the rotary shaft.

As illustrated in FIG. 7, the base plate 70 is made up of an annular part 70a, an extension 70b, and a tip 70e.

The annular part 70a is annularly provided about the rotary shaft of the carrier 7 and connected with three extensions 70b extended outward from the annular part 70a.

The extensions 70b are arranged at equal intervals in a circumferential direction about the rotary shaft of the carrier 7. The tip 70e is provided on each extension 70b along the circumference about the rotary shaft of the carrier 7.

On the base plate 70, a J-shaped notch 70c is made up of the annular part 70a, the extension 70b, and the tip 70e. The small gear 32b of the second stepped pinion 32 is disposed in the notch 70c.

The extension 70b is provided with a circular arc part 70d depressed in an arc shape on the opposite side to the notch 70c, and small gear 31b of the first stepped pinion 31 is disposed.

In the annular part 70a, the fourth stay 74 and the fifth stay 75 are provided on the rotary shaft side of the carrier 7 so as to be orthogonal to the base plate 70.

Further, in the extension 70b, the third stay 73 is provided so as to be orthogonal to the base plate 70. The first stay 71, the second stay 72, and the sixth stay 77 are provided so as to be orthogonal to the base plate 70 at the tip 70e.

That is, the first stay 71, the second stay 72, the third stay 73, the fourth stay 74, the fifth stay 75, and the sixth stay 77 are extended from the base plate 70 in the horizontal direction of the axle driving device 1.

Three each of the first stays 71, the second stays 72, the third stays 73, the fourth stays 74, the fifth stays 75, and the sixth stays 77 are provided and disposed at equal intervals in the turning direction of the carrier 7.

On the base plate 70, the annular part 70a, the extension 70b and the tip 70e are provided on the same plane, to form a plane portion. That is, the first stay 71, the second stay 72, the third stay 73, the fourth stay 74, the fifth stay 75, and the sixth stay 77 are extended from the edge of the plane portion of the base plate 70.

Therefore, the base plate 70 can be molded by press working. A plate-like member is subjected to shielding and bending according to press working so that the base plate 70 can be processed integrally with the first stay 71, the second stay 72, the third stay 73, the fourth stay 74, the fifth stay 75, and the sixth stay 77.

The base plate 70 in the shape of being developed on the same plane is cut out from the plate member by shielding. In this state, the first stay 71, the second stay 72, the third stay 73, the fourth stay 74, the fifth stay 75, and the sixth stay 77 are also developed on the same plane.

Then, the first stay 71, the second stay 72, and the fifth stay 75 are folded to one side by bending. The third stay 73, the fourth stay 74, and the sixth stay 77 are then folded to the other side.

As a result, six kinds of stays extending from the base plate 70 in the horizontal direction of the axle driving device 1 are configured.

On the base plate 70, the support hole 76 for holding the support shaft 33c can also be formed by shielding.

The side plate 9 and the differential case 44 are connected by the base plate 70 molded as described above. The side plate 9 and the differential case 44 are configured by forging and are each fixed to the base plate 70 by welding.

That is, the differential case 44 is fixed by welding to the tip of each of the third stay 73, the fourth stay 74, and the sixth stay 77. The side plate 9 is fixed by welding to the tip of each of the first stay 71, the second stay 72, and the fifth stay 75.

As thus described, the differential case 44 and the side plate 9 are connected by the base plate 70 molded by press working, and hence the base plate 70 can be molded with ease. Further, molding the differential case 44 and the side plate 9 by forging enables configuration of the carrier 7 with high molding accuracy.

As illustrated in FIG. 6, the first stay 71, the second stay 72, and the fifth stay 75 are extended from the base plate 70 to the left side of the axle driving device 1, to fix the side plate 9 to the base plate 70. The first stay 71 and the second stay 72 are connected to the outer peripheral edge of the side plate 9.

Further, the first stay 71 and the second stay 72 are arranged on the outside of the support shaft 33c of the first outer pinion 33 (the side farther from the rotary shaft of the side plate 9). Note each of that the first stay 71 and the second stay 72 is formed in a shape along the outer peripheral edge of the side plate 9 and has a circular arc shape in the horizontal view of the axle driving device 1.

The fifth stay 75 is connected to the edge of an opening 92 of the side plate 9, and the motor driving shaft 2 is inserted into the opening 92. The fifth stay 75 is disposed so as to surround the outer peripheral surface of the sun gear 21 of the motor driving shaft 2.

The sun gear 21 meshes with the large gear 31a of the first stepped pinion 31 between the fifth stays 75.

As illustrated in FIG. 8, the third stay 73, the fourth stay 74, and the sixth stay 77 are extended from the portion orthogonal to the rotary shaft of the base plate 70 to the right side of the axle driving device 1, and fixes the differential case 44 to the base plate 70.

The differential case 44 is provided with an opening 44b in a circular shape, into which the first axle 5 is inserted, and the fourth stay 74 is connected around the opening 44b. Note that the fourth stay 74 is configured to have an arc shape in cross section along the shape of the edge of the opening 44b.

Further, the outer periphery of the large gear 32a of the second stepped pinion 32 is located between the fourth stays 74.

On the base plate 70, the third stay 73 is provided along a direction from the rotary shaft of the carrier 7 to the outside. On the surface orthogonal to the rotary shaft of the carrier 7, the third stay 73 has an arc shape protruding from the base plate 70 side in a cross section.

Further, the third stay 73 is disposed between the first stepped pinion 31 and the second stepped pinion 32.

On the base plate 70, the sixth stay 77 is provided along the direction from the rotary shaft of the carrier 7 to the outside. The sixth stay 77 is connected to the outer peripheral portion of the differential case 44, and the small gear 31b of the first stepped pinion is disposed between the fourth stay 74 and the sixth stay 77.

The third stay 73, the fourth stay 74, and the sixth stay 77 are disposed outward about the first axle 5. That is, on the plane orthogonal to the rotary shaft of the first axle 5, the fourth stay 74 is disposed between the second stepped pinions 32 so as to have an arc shape about the first axle 5.

The third stay 73 is provided on the outside of the fourth stay 74 about the first axle 5. The third stay 73 is provided in an arc shape along the outer periphery of the small gear 31b of the first stepped pinion 31.

Further, on the outside of the fourth stay 74, the sixth stay 77 is extended from the outer periphery of the base plate 70 toward the space between the second outer pinion 36 and the small gear 31b.

As illustrated in FIG. 8, the third stay 73, the fourth stay 74, and the sixth stay 77 are disposed radially about the first axle 5. Therefore, in each of the base plate 70 and the differential case 44 about the first axle 5, the third stay 73, the fourth stay 74, and the sixth stay 77 are sequentially arranged on three sides, respectively.

Further, as illustrated in FIG. 2, the cover plate 8 is mounted on the side plate 9, and the first stepped pinion 31 is disposed on the opposite side of the side plate 9 from the cover plate 8.

The side plate 9 is provided with a rising part 96 extended in the direction of the rotary shaft along the motor driving shaft 2 on the rotary shaft side of the side plate 9. The rising part 96 is provided along the opening 92, and an annular oil passage 91a is provided outside the rising part 96. The annular oil passage 91a is annularly provided along the outside of the rising part 96 and formed by depressing the surface of the side plate 9 on the cover plate 8 side to the right side of the axle driving device 1.

The annular oil passage 91a is provided on the surface of the side plate 9 on the cover plate 8 side. As illustrated in FIGS. 3 to 5, oil passages 91b, 91c, 91d, 91e radially extending from the rotating center side of the side plate 9 are connected to the annular oil passage 91a. The oil passages 91b, 91c, 91d, 91e are connected to lubricating oil passages 31d, 32d, 33d, 36d provided inside the support shafts 31c, 32c, 33c, 36c of the planetary gear, respectively.

As illustrated in FIGS. 2 and 3, the cover plate 8 has an offset part 82 on the rising part 96 side, which is offset on the opposite side to the first stepped pinion 31. The offset part 82 is connected to an attachment part 83 that is attached to the side plate 9 via a connection part 84 inclined from the offset part 82 to the first stepped pinion 31 side.

In a state where the attachment part 83 of the cover plate 8 is attached to the side plate 9, the offset part 82 is held in a position not in contact with the side plate 9. As a result, an opening 85 is provided between the offset part 82 and the side plate 9.

The opening 85 is annularly provided around the rising part 96 of the side plate 9 and communicates with the annular oil passage 91a.

As illustrated in FIG. 3, the lubricating oil passage 31d is provided inside the support shaft 31c of the first stepped pinion 31, and the lubricating oil passage 31d is connected to the annular oil passage 91a via the oil passage 91c. Further, the lubricating oil passage 33d is provided inside the support shaft 33c of the first outer pinion 33, and the lubricating oil passage 33d is connected to the annular oil passage 91a via the oil passage 91b.

As illustrated in FIG. 4, the lubricating oil passage 32d is provided inside the support shaft 32c of the second stepped pinion 32, and the lubricating oil passage 32d is connected to the annular oil passage 91a via the oil passage 91d.

As illustrated in FIG. 5, the lubricating oil passage 36d is provided inside the support shaft 36c of the second outer pinion 36, and the lubricating oil passage 36d is connected to the annular oil passage 91a via the oil passage 91e.

The lubricating oil passages 31d, 32d, 33d, 36d provided in the support shafts 31c, 32c, 33c, 36c of the planetary gear are provided along the extending directions of the support shafts 31c, 32c, 33c, 36c where the respective passages are provided. Oil passages (not illustrated) are connected to the lubricating oil passages 31d, 32d, 33d, 36d in the support shafts 31c, 32c, 33c, 36c where the respective passages are provided. Then, lubricating oil can be supplied between each of the support shafts 31c, 32c, 33c, 36c and each of the first stepped pinion 31, the second stepped pinion 32, the first outer pinion 33, and the second outer pinion 36 which are the planetary gears.

Note that a sliding bearing or a rolling bearing can be provided between each of the first stepped pinion 31, the second stepped pinion 32, the first outer pinion 33, the second outer pinion 36, and each of the support shafts 31c, 32c, 33c, 36c.

In the above configuration, enough lubricating oil can be supplied to each of the support shafts 31c, 32c, 33c, 36c, so that the first stepped pinion 31 can be supported via the sliding bearing mounted on the support shaft 31c. Further, a needle bearing may be disposed in a middle part of the support shaft 31c to rotatably support the first stepped pinion 31.

Note that the second stepped pinion 32, the first outer pinion 33, and the second outer pinion 36 which are the other planetary gears, can also be supported in the same manner as above.

Further, in the above configuration, as the engagement unit 12, a dog clutch or the like provided movably in the direction of the rotary shaft of the second ring gear 35 can be used in the housing case 11. By taking the position selection unit 12a as one actuator and driving the dog clutch, the dog clutch can be moved for shift transmission and parking by using one actuator.

Note that each of the first ring gear 34, the second ring gear 35, and the ring gear 43 can be individually provided with the engagement unit 12 and individually fixed to the housing case 11.

Figure 13A:
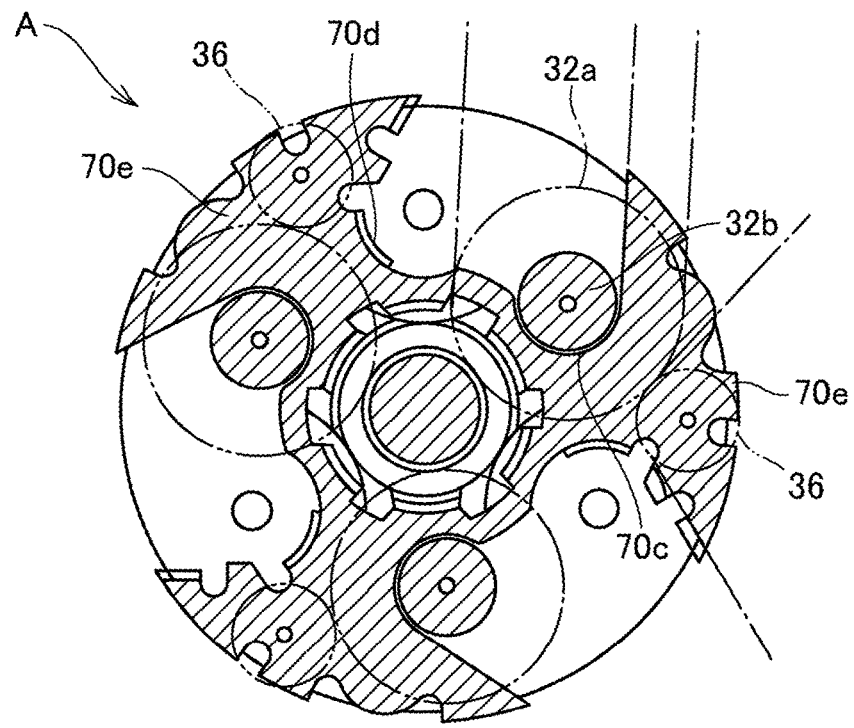
FIG. 13A is a view illustrating an assembly order of a first stepped pinion.
Figure 13B:
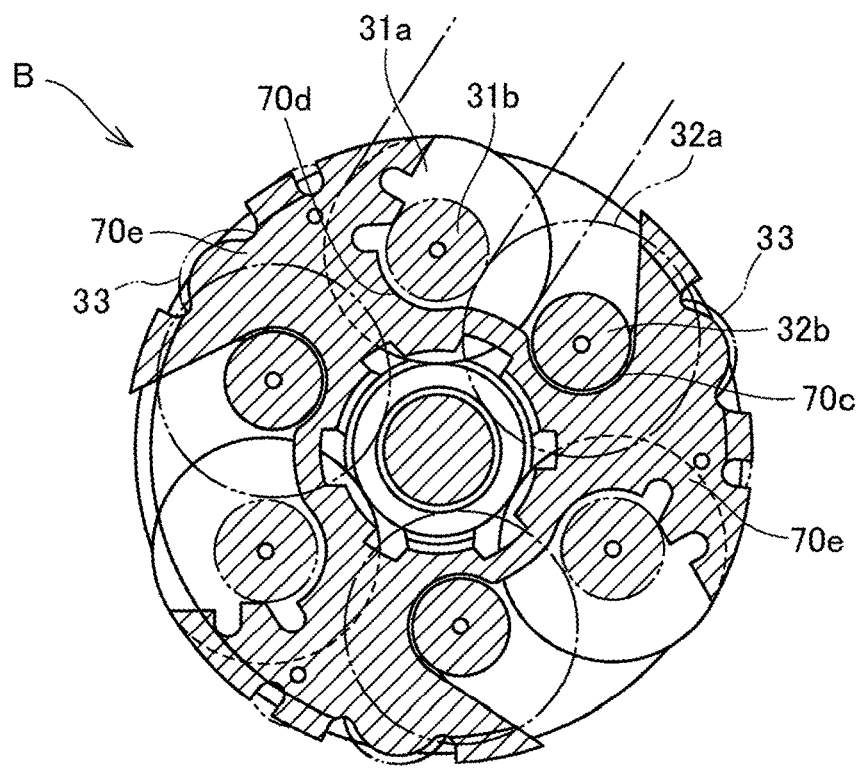
FIG. 13B is a view illustrating an assembly order of a second stepped pinion.

Next, the method for assembling the axle driving device will be described with reference to FIGS. 13A and 13B. FIG. 13A is a view illustrating an assembly order of a first stepped pinion and FIG. 13B is a view illustrating an assembly order of a second stepped pinion.

On the carrier 7, three second stepped pinions 32 are assembled between the side plate 9 and the differential case 44.

Three second outer pinions 36 are then assembled between the base plate 70 and the differential case 44. At this time, the second outer pinion 36 is meshed with the large gear 32a of the second stepped pinion 32.

Further, three first stepped pinions 31 are assembled between the side plate 9 and the differential case 44. At this time, the small gear 31b of the first stepped pinion 31 is meshed with the large gear 32a of the second stepped pinion 32.

Finally, three first outer pinions 33 are assembled between the base plate 70 and the side plate 9. At this time, the first outer pinion 33 is meshed with the small gear 32b of the second stepped pinion 32.

Thereafter, the differential mechanism 4 is attached to the carrier 7, and the first axle 5 and the second axle 6 are inserted into the carrier 7. Then, the planet gear mechanism 3 and the differential mechanism 4 are disposed in the housing case 11 provided with the engagement unit 12 and the position selection unit 12a.

The first stepped pinion 31 and the second stepped pinion 32 are inserted between the side plate 9 and the differential case 44 from the direction orthogonal to the rotary shaft of the carrier 7. The support shaft 31c and the support shaft 32c are then inserted from the side plate 9 toward the differential case 44, and the first stepped pinion 31 and the second stepped pinion 32 are rotatably attached to the carrier 7.

The first outer pinion 33 is inserted between the side plate 9 and the base plate 70 from the direction orthogonal to the rotary shaft of the carrier 7. The support shaft 33c is then inserted from the side plate 9 toward the differential case 44, and the first outer pinion 33 is rotatably attached to the carrier 7.

The second outer pinion 36 is inserted between the base plate 70 and the differential case 44 from the direction orthogonal to the rotary shaft of the carrier 7. The support shaft 36c is then inserted from the side plate 9 toward the differential case 44, and the second outer pinion 36 is rotatably attached to the carrier 7.

Next, the function of the axle driving device 1 of the present disclosure will be described.

When the electric motor (not illustrated) installed inside the case of the axle driving device 1 is activated, a rotor of the electric motor is driven. The motor driving shaft 2 is attached to the rotor of the electric motor, and the motor driving shaft 2 is driven.

When a driving force is transmitted by the motor driving shaft 2, the first stepped pinion 31 is driven by the sun gear 21 fixed to the motor driving shaft 2. The first stepped pinion 31 transmits the driving force to the second stepped pinion 32 by using the small gear 31b. Since the driving force input into the large gear 31a is transmitted from the small gear 31b, the driving force is decelerated in the first stepped pinion 31.

Thereafter, the transmission channel of the driving force can be changed by the position of the engagement unit 12, to change the deceleration ratio.

When the engagement unit 12 is positioned at the position Hi by the position selection unit 12a, the driving force is transmitted to the second ring gear 35 via the second outer pinion 36 meshing with the large gear 32a of the second stepped pinion 32. With the second ring gear 35 being fixed to the housing case 11 by the engagement unit 12, the second outer pinion 36 makes a revolving motion along the second ring gear 35. Thereby, the carrier 7 supporting the second outer pinion 36 is driven, and the driving force is transmitted to the differential mechanism 4.

Since the first ring gear 34 is not fixed to the housing case 11, the first ring gear 34 spins out.

That is, when the engagement unit 12 is positioned at the position Hi, the driving force is decelerated between the sun gear 21 and the large gear 31a of the first stepped pinion 31 and between the small gear 31b of the first stepped pinion 31 and the second ring gear 35.

When the engagement unit 12 is positioned at the position Lo, the first ring gear 34 is fixed to the housing case 11, and the second ring gear 35 is not fixed to the housing case 11.

The driving force of the first stepped pinion 31 is transmitted to the large gear 32a of the second stepped pinion 32, and the driving force is decelerated in the second stepped pinion 32.

The driving force is then transmitted from the small gear 32b of the second stepped pinion 32 to the first outer pinion 33.

With the first ring gear 34 being fixed by the engagement unit 12, the first outer pinion 33 makes a revolving motion along the first ring gear 34.

Thereby, the carrier 7 supporting the first outer pinion 33 is driven, and the driving force is transmitted to the differential mechanism 4.

That is, when the engagement unit 12 is positioned at the position Lo, the driving force is decelerated between the sun gear 21 and the large gear 31a, between the small gear 31b and the large gear 32a, and between the small gear 32b and the first ring gear 34.

In the driving-force transmission channel in the above case where the engagement unit 12 is positioned at the position Lo, the first stepped pinion 31 and the second stepped pinion 32 are connected in series to decelerate the driving force. The small gear 32b of the second stepped pinion 32 is disposed on the large gear 31a side of the first stepped pinion 31 in the planet gear mechanism 3, and the large gear 32a is disposed on the small gear 31b side.

Thereby, the driving force is transmitted by the first stepped pinion 31 to the small gear 31b side which is on the right side of the axle driving device 1, and the driving force is transmitted by the second stepped pinion 32 to the small gear 32b side which is the left side of the axle driving device 1.

Hence it is possible to fold back the driving force in the extending directions of the support shaft 31c and the support shaft 32c by using the first stepped pinion 31 and the second stepped pinion 32 which are a plurality of stepped gears in the planet gear mechanism 3. The deceleration channel for decelerating the driving force is folded back in the horizontal direction of the axle driving device 1, and a large deceleration ratio can thus be obtained while a small space is in use.

As thus described, the deceleration ratio of the axle driving device 1 can be selected by the position of the engagement unit 12. When the engagement unit 12 is positioned at the position Hi, the deceleration ratio of the axle driving device 1 is small and a high turning speed can be obtained. When the engagement unit 12 is positioned at the position Lo, the deceleration ratio of the axle driving device 1 is large and high torque can be obtained.

When the engagement unit 12 is positioned at the position Hi or the position Lo, the driving force is transmitted to the carrier 7, and a driving force is transmitted to the differential mechanism 4.

The differential case 44 is rotated by rotation of the carrier 7, and the ring gear 43 integrally provided with the differential case 44 rotates.

The driving force of the ring gear 43 is transmitted to the support plate 61 via the first pinion gear 41 and transmitted to the gear 51 via the second pinion gear 42.

Hence a driving force, input into the differential case 44, is transmitted to each of the first axle 5 and the second axle 6 via the differential mechanism 4.

However, when the engagement unit 12 is positioned at the position P by the position selection unit 12a, the ring gear 43 is fixed to the housing case 11. As a result, the carrier 7 is fixed to the housing case 11, and the driving force from the motor driving shaft 2 is not transmitted to the differential mechanism 4.

When the engagement unit 12 is positioned at the position P, the first ring gear 34 and the second ring gear 35 are not fixed to the housing case 11. Hence the first ring gear 34 and the second ring gear 35 spin out.

In the planet gear mechanism 3 described above, each of the first stepped pinion 31 and the second stepped pinion 32 can be efficiently arranged in the limited space.

The small gear 32b of the second stepped pinion 32 downstream of the driving-force channel is connected to the first ring gear 34 via the first outer pinion 33. By the connection via the first outer pinion 33, the flexibility in placement of the second stepped pinion 32 increases, and it is possible to increase the deceleration ratio by making the diameter of the second stepped pinion 32 larger.

In addition, it is possible to increase the deceleration ratio of the planet gear mechanism 3 by making the first ring gear 34 larger.

Since the large gear 32a of the second stepped pinion 32 is offset with the sun gear 21 of the motor driving shaft 2, the second stepped pinion 32 can be disposed on the inside of the rotary shaft of the planet gear mechanism 3. Further, it is possible to increase the large gear 32a and achieve the planet gear mechanism 3 with a high deceleration ratio.

Since the support shaft 33c of the first outer pinion 33 is disposed on the outside of the support shaft 32c of the second stepped pinion 32, the second stepped pinion 32 can be disposed closer to the rotary shaft side of the planet gear mechanism 3. Hence the moment generated during rotation of the planet gear mechanism 3 can be reduced. Further, the vibration that occurs during rotation of the carrier 7 can be reduced.

In the planet gear mechanism 3, the shaft end of each of the first stepped pinion 31, the second stepped pinion 32, the first outer pinion 33, and the second outer pinion 36 is fixed to the carrier 7. Each of these can be rotatably supported via a sliding bearing or a rolling bearing which is mounted on each of the support shafts 31c, 32c, 33c, 36c.

Due to there being no need for providing a bearing at each end of the shaft of the planetary gear, it is possible to narrow the width for holding each of the support shafts 31c, 32c, 33c, 36c in each of the differential case 44 and the side plate 9. Therefore, the width of the carrier 7 can be made narrow as compared to the case of disposing the rolling bearing at the end of each support shaft.

As illustrated in FIG. 3, both ends of the support shaft 31c are fixed to the carrier 7, and the first stepped pinion 31 is rotatably inserted and fitted into the support shaft 31c. As a result, even when the first stepped pinion 31 rotates itself, the support shaft 31c does not rotate itself. With the support shaft 31c not rotating itself, the support shaft 31c is not included in the mass of the first stepped pinion 31 when the first stepped pinion 31 rotates itself. The turning moment of the first stepped pinion 31 can thus be kept low.

Further, since the lubricating oil passage 31d is provided inside the support shaft 31c, the mass of the support shaft 31c is reduced, and the turning moment is lowered at the time of revolution of the support shaft 31c.

The other support shafts 32c, 33c, 36c have similar configuration to that of the support shaft 31c, thereby reducing the mass in the planet gear mechanism 3 and reducing the turning moment of each planet gear. It is thereby possible to reduce a load applied to the carrier 7 when turned and reduce distortion generated in the carrier 7. Then, deviation in placement of the planet gear in the carrier 7 is reduced, and the generation of noise is reduced.

Further, noise is reduced by the first ring gear 34 and the second ring gear 35.

The sun gear 21, the first stepped pinion 31, the second stepped pinion 32, the first outer pinion 33, and the second outer pinion 36 are arranged inside the first ring gear 34 and the second ring gear 35. That is, in the planet gear mechanism 3, a portion where the gears mesh each other is covered by the first ring gear 34 and the second ring gear 35 to reduce noise in the direction orthogonal to the rotary shaft.

Further, since the large gear 31a of the first stepped pinion 31 is meshed with the sun gear 21, a large deceleration ratio is set on the upstream side of the driving-force transmission channel to reduce the turning speed of the carrier 7. This lowers the turning speed of the carrier 7 and lowers a frequency of generated vibration. It is thereby possible to reduce a high frequency component in vibration generated by the operation of the axle driving device 1.

Further, since the first ring gear 34 and the second ring gear 35 are disposed adjacent to each other, the distance by which the engagement unit 12 moves is short. Hence it is possible to shorten the distance, by which the actuator for driving the engagement unit 12 is driven, and compactly constitute the axle driving device 1 including the engagement unit 12.

Further, the two-speed variable axle driving device 1 can be compactly configured at a deceleration ratio of about 20.

Note that engagement unit 12 can be configured in a simple shape by making uniform the outer diameters of the first ring gear 34 and the second ring gear 35.

Further, on the base plate 70, a space opened to the outer side with respect to the rotary shaft is provided between the tips 70e, and the first stepped pinion 31 and the second stepped pinion 32 are arranged. As a result, the first stepped pinion 31 and the second stepped pinion 32 can be assembled from the outside by using the space between the tips 70e.

The third stay 73 is provided along the outer periphery of the small gear 31b of the first stepped pinion 31, and provided on the opposite side to the space between the tips 70e, through which the first stepped pinion 31 is provided. Hence the third stay 73 serves as a guide of the small gear 31b of the first stepped pinion 31, and the assembly work for the first stepped pinion 31 is not inhibited by the third stay 73.

Further, from the outer periphery of the base plate 70, the sixth stay 77 extends inward and toward the space between the second outer pinion 36 and the small gear 31b. It is then possible to take a large space between the base plate 70 and the differential case 44 in the revolving direction of the second outer pinion 36. Hence the sixth stay 77 serves as a guide at the assembly of the first stepped pinion 31, and the assembly work for the second outer pinion 36 is not inhibited by the sixth stay 77.

Further, the fourth stay 74 and the third stay 73 are arranged using the space between the planetary gears, thereby enabling compact configuration of the carrier 7. The supporting rigidity between the second stepped pinions 32 can be improved. Further, with the sixth stay 77 being provided in the vicinity of the second outer pinion 36, the supporting rigidity of the second outer pinion 36 can be improved.

Since the third stay 73 is provided in the extension 70b of the base plate 70 along a centrifugal direction, the rigidity of the base plate 70 in the centrifugal direction can be improved. Therefore, it is possible to improve the supporting rigidity of each of the first outer pinion 33 and the second outer pinion 36 which are supported at the tip 70e.

In the planet gear mechanism 3, the improvement in supporting rigidity of the planetary gear leads to improvement in meshing accuracy in tooth between the planetary gears, and hence noise can be reduced.

Further, the plane portion of the base plate 70, the side plate 9, and the differential case are placed on the surface orthogonal to the rotary shaft of the carrier 7, so that the inside of the carrier 7 can be viewed from the direction orthogonal to the rotary shaft.

When the carrier 7 is seen from the direction orthogonal to the rotary shaft of the carrier 7, only the stay connecting the side plate 9 and the differential case 44 cuts off the view. Hence it is configured that the view is easily ensured and there are few parts that obstruct the view in the direction in which the gear is assembled.

Further, there is a difference between the placement of the stay between the side plate 9 and the base plate 70 and the placement of the stay between the differential case 44 and the base plate 70. Thus, even when the view is cut off by one stay, it is possible to view the inside from the opposite side to the base plate 70.

Therefore, the visibility of the working space can be ensured.

The small gear 31b of the first stepped pinion 31 and the second outer pinion 36 are arranged on the opposite side to the shaft center of the large gear 32a of the second stepped pinion 32. Hence a part of an influence due to meshing between the large gear 32a and the small gear 31b can be canceled by meshing between the second outer pinion 36 and the large gear 32a. It is thus possible to reduce torsion of the second stepped pinion 32 and reduce noise due to meshing of the large gear 32a.

The second outer pinion 36 is disposed in a position where the second outer pinion 36 overlaps with the large gear 31a between the first stepped pinion 31 and the second stepped pinion 32 in a horizontal view of the axle driving device 1. Thus, the second outer pinion 36 is disposed using the space between the gears in the planet gear mechanism 3, so that it is possible to compactly constitute the planet gear mechanism 3.

In the assembly of the gear to the carrier 7, as illustrated in a state A of FIGS. 13A and 13B, first, the second stepped pinion 32 and the second outer pinion 36 are assembled. Thereafter, as illustrated in a state B, the first stepped pinion 31 is assembled, and the first outer pinion 33 is assembled.

As described above, the second stepped pinion 32 is first assembled to the carrier 7. The small gear 32b of the second stepped pinion 32 is guided to an assembly position due to the shapes of the tip 70e and the notch 70c of the base plate 70.

In this state, the third stay 73, the fourth stay 74, and the sixth stay 77 are arranged radially about the first axle 5, and thus become less likely to cut off the view when seen from the outside of the carrier 7. This makes it easier to confirm the position of the second stepped pinion 32 and improves the workability at the time of the assembly.

After the assembly of the second stepped pinion 32, the second outer pinion 36 is assembled to the carrier 7. At this time, the second outer pinion 36 is assembled such that the teeth of the second outer pinion 36 mesh with the teeth of the large gear 32a of the second stepped pinion 32.

The second outer pinion 36 is located outside the second stepped pinion 32, so that the working space is not blocked by the second stepped pinion 32, and the second outer pinion 36 can be easily assembled.

With the support shaft 36c being provided through the vicinity of the first stepped pinion 31, it is possible to take a large working space by assembling the second outer pinion 36 before the assembly of the first stepped pinion 31.

After the assembly of the second stepped pinion 32 and the second outer pinion 36 to the carrier 7, the first stepped pinion 31 is assembled to the carrier 7. The small gear 31b of the first stepped pinion 31 is guided to an assembly position due to the shapes of the tip 70e and the arc part 70d of the base plate 70. At this time, the large gear 31a comes close to the support shaft 36c. However, there is a space between the tips 70e of the base plate 70, and the space for access to the first stepped pinion 31 is ensured. Further, the assembly is performed such that the teeth of the small gear 31b of the first stepped pinion 31 mesh with the teeth of the large gear 32a of the second stepped pinion 32.

Further, the first outer pinion 33 is assembled to the carrier 7. At this time, the first outer pinion 33 is disposed with its teeth positioned so as to mesh only with the small gear 32b of the second stepped pinion 32.

By performing the assembly as thus described, a large space for assembly can be taken and not more than one gear needs to be considered at the time of assembly, thereby facilitating the assembly.

Note that each of the support shafts 31c, 32c, 33c, 36c of each of the first stepped pinion 31, the second stepped pinion 32, the first outer pinion 33, and the second outer pinion 36 is attached to the carrier 7 through the side plate 9.

On the oil passage 91 of the side plate 9, a hole for insertion of the support shaft is provided at the edge-side end of each of the linear oil passages 91c, 91d, 91b, 91e. Each of the support shafts 31c, 32c, 33c, 36c is then inserted into the hole for insertion of the support shaft in the side plate 9.

In the embodiment of the present disclosure, it is also possible to connect a plurality of planet gear mechanisms 3 for deceleration. For example, the carrier 7 is not connected to the differential mechanism 4, but the sun gear that rotates integrally with the carrier 7 is provided on the differential mechanism 4 side of the carrier 7. The first stepped pinion 31 of the planet gear mechanism 3 is then connected to this sun gear, whereby a driving force can be decelerated using two planet gear mechanisms 3.

It is possible to constitute the axle driving device 1 including four ring gears and being four-speed variable.

Next, lubrication and cooling of the planet gear mechanism 3 will be described.

By rotation of the carrier 7, lubricating oil stored in the axle driving device 1 is splashed. The lubricating oil having been splashed and reached the opening 85 flows into the annular oil passage 91a. The oil flows into each of the oil passage 91b, the oil passage 91c, the oil passage 91d, and the oil passage 91e by a centrifugal force generated due to turning of the carrier 7.

Note that the lubricating oil having flown in from the opening 85 flows out to nowhere other than each of the oil passage 91b, the oil passage 91c, the oil passage 91d, and the oil passage 91e, and the lubricating oil is then supplied to each of the lubricating oil passage 33d, the lubricating oil passage 31d, the lubricating oil passage 32d, and the lubricating oil passage 36d. By reliably supplying lubricating oil to the gear from the inside of the support shaft, it is possible to obtain lubrication and cool the gear with lubricating oil.

In the support shaft 36c, the lubricating oil passage 36d is provided through the inside of the small diameter part 36g. It is thereby possible to avoid the large gear 31a of the first stepped pinion 31 disposed in the vicinity of the support shaft 36c and supply lubricating oil to the second outer pinion 36. Further, by providing the lubricating oil passage 36d in the small diameter part 36g, the length of the oil passage from the end of the oil passage 91e to the second outer pinion 36 can be made short.

Moreover, by providing the small diameter part 36g in the support shaft 36c, it is possible to supply lubricating oil to the second outer pinion 36 while disposing the first stepped pinion 31 closer to the rotary shaft side of the carrier 7. The second outer pinion 36 can then lubricated and cooled while compactly constituting the planet gear mechanism 3.

Accordingly, by the simply structure formed of the oil passages provided by the surface shape of the side plate 9 and the cover plate 8, a lubrication mechanism of the planet gear mechanism 3 can be configured. It is possible to reliably supply lubricating oil to the first stepped pinion 31, the second stepped pinion 32, the first outer pinion 33, and the second outer pinion 36 of the planet gear mechanism 3. Lubricating oil for lubrication and cooling is reliably supplied, and cooling is performed with the lubricating oil. Therefore, even in the complex planet gear mechanism 3, it is possible to prevent overheating and expansion of the first stepped pinion 31, the second stepped pinion 32, the first outer pinion 33, and the second outer pinion 36.

Further, lubricating oil is supplied to the support shaft 33c of the first outer pinion 33 by the oil passage 91b linearly provided from the vicinity of the rotary shaft of the side plate 9 that is the support member of the support shaft 33c. In the same manner, lubricating oil is also supplied to the support shaft 36c of the second outer pinion 36 by the oil passage 91e. It is thus possible to shorten the supply channel of lubricating oil and reliably supply the lubricating oil.

Moreover, removing the cover plate 8 can facilitate maintenance of the annular oil passage 91a, the oil passage 91b, the oil passage 91c, and the oil passage 91d.

As described above, according to the embodiment to which the present disclosure has been applied, the axle driving device includes, between the first axle 5 (the first axle) and the second axle 6 (the second axle), the planet gear mechanism 3 that transmits a driving force via the differential mechanism 4. The carrier 7 of the planet gear mechanism 3 includes the side plate 9 (the first plate-like member), the differential case 44 (the second plate-like member), and the plate-like member (the third plate-like member) made up of the base plate 70 that connects the side plate 9 and the differential case 44, the first stay 71, the second stay 72, the third stay 73, the fourth stay 74, the fifth stay 75, and the sixth stay 77.

This plate-like member is orthogonal to the rotary shaft of the carrier 7, and includes the base plate 70 located between the side plate 9 and the differential case 44, and the first stay 71, the second stay 72, and the fifth stay 75 as a plurality of stays extended from the base plate 70 to the side plate 9. The plate-like member including the base plate 70 includes the third stay 73, the fourth stay 74, and the sixth stay 77 as a plurality of stays extended to the differential case 44.

It is thereby possible to make the length of each of the first stay 71, the second stay 72, the fifth stay 75, the third stay 73, the fourth stay 74, and the sixth stay 77 smaller than the length between the side plate 9 and the differential case 44 in the direction of the rotary shaft of the carrier 7. Then, the rigidity of each stay improves.

Further, irrespective of the arrangement configuration of the planet gear between the side plate 9 and the base plate 70, the stay can be provided between the differential case 44 and the base plate 70. For example, as illustrated in FIG. 8, the fifth stay 75 can be disposed in a position where the fifth stay 75 overlaps with the large gear 32a of the second stepped pinion 32. Each of the third stay 73, the fourth stay 74, and the sixth stay 77 can be disposed in a position where each stay overlaps with the large gear 31a of the first stepped pinion 31. This can improve the flexibility in placement of the planet gear in the carrier 7.

The first stay 71, the second stay 72, the fifth stay 75, the third stay 73, the fourth stay 74, and the sixth stay 77 are provided integrally with the base plate 70. This improves the rigidity of the connection part of the side plate 9 and the differential case 44, thereby enabling improvement in rigidity of the carrier 7. It is possible to improve the rigidity in support of each of the first stepped pinion 31, the second stepped pinion 32, the first outer pinion 33, and the second outer pinion 36 by the carrier 7.

Accordingly, the supporting rigidity of the planetary gear improves, so that the accuracy in meshing between the planetary gears improves, and noise can be reduced.

According to the present disclosure, the plate-like member including the base plate 70 is molded by folding, to the base plate 70 by press working, the first stay 71, second stay 72, and the fifth stay 75 which are connected to the side plate 9, and the third stay 73, the fourth stay 74, and the sixth stay 77 which are connected to the differential case 44. The first stay 71, second stay 72, and the fifth stay 75 which are connected to the side plate 9, and the third stay 73, the fourth stay 74, and the sixth stay 77 which are connected to the differential case 44 are fixed by welding.

It is thereby possible to simply manufacture the base plate 70 and reduce cost for manufacturing of the carrier 7. Since the stays are fixed by welding, as compared to the case of the stays being fixed by fastening, it is possible to constitute the carrier 7 that is lightweight and highly resistant to earthquake shaking, and facilitate handling of the carrier 7 at the time of assembly. In addition, the fixing part is smooth in appearance, and it is thus possible to reduce generation of a catch at the time of assembly. The ease of assembly of the planet gear mechanism 3 thus improves.

According to the present disclosure, the support shaft 36c of the second outer pinion 36 which is the planetary gear held by the carrier 7 is the stepped shaft having the small diameter part 36g, and the small diameter part 36g is exposed between the side plate 9 and the base plate 70.

Therefore, as compared to the case of using support shafts having a uniform outer diameter, the space around the small diameter part 36g can be used in placement and assembly of the planetary gear. This can improve the flexibility in placement of the gear disposed in the carrier 7. For example, the large gear 31a of the first stepped pinion 31 can be disposed using the space in the vicinity of the small diameter part 36g, thereby facilitating assembly of the first stepped pinion 31. In addition, the diameter of the large gear 31a can be made large, to increase the deceleration ratio in the planet gear mechanism 3.

In the present disclosure, the carrier 7 of the planet gear mechanism 3 includes the side plate 9 (the first plate-like member), the differential case 44 (the second plate-like member), and the plate-like member (the third plate-like member) disposed between the side plate 9 and the differential case 44 and made up of the base plate 70, the first stay 71, the second stay 72, the third stay 73, the fourth stay 74, the fifth stay 75, and the sixth stay 77. This plate-like member including the base plate 70 is orthogonal to the rotary shaft of the carrier 7 and located between the side plate 9 and the differential case 44. The plate-like member including the base plate 70 includes the annular part 70a provided in an annular shape about the rotary shaft, and a plurality of extensions 70b extended from the annular part 70a to the outside and arranged at equal intervals in the circumferential direction about the rotary shaft. The method for assembling the axle driving device includes the steps of: attaching the second stepped pinion 32 (the first stepped gear) between the extensions 70b, with the small gear 32b (the smaller gear) facing the side plate 9; attaching the second outer pinion 36 (the first planetary gear) between the side plate 9 and the base plate 70 while causing the second outer pinion 36 to mesh with the large gear 32a (the larger gear) of the second stepped pinion 32; attaching the small gear 31b (the smaller gear) of the first stepped pinion 31 (the second stepped gear) between the extensions 70b while causing the small gear 31b to mesh with the large gear 32a of the second stepped pinion 32; and attaching the first outer pinion 33 (the second planetary gear) between the differential case 44 and the base plate while causing the first outer pinion 33 to mesh with the small gear 32b of the second stepped pinion 32.

Accordingly, at the time of assembling the gear, the number of objects to mesh with is one, and the gear may only be assembled in consideration of the position of the teeth of the object. This can facilitate assembly of the gear to the planet gear mechanism 3.

The embodiment described above only shows one aspect of the present disclosure and can be arbitrarily modified or applied in the scope not deviating from the gist of the present disclosure.

REFERENCE SIGNS LIST

1 Axle driving device
2 Motor driving shaft
3 Planet gear mechanism
4 Differential mechanism
5 First axle
6 Second axle
7 Carrier
9 Side plate
11 Housing case
31 First stepped pinion
31a Large gear
31b Small gear
33 Second stepped pinion
32a Large gear
32b Small gear
33 First outer pinion
34 First ring gear
35 Second ring gear
36 Second outer pinion
44 Differential case

What is claimed is:

1. An axle driving device comprising a planet gear mechanism configured to transmit a driving force to a first axle and a second axle via a differential mechanism,
   wherein
   a carrier of the planet gear mechanism includes a first plate-like member, a second plate-like member, and a third plate-like member that connects the first plate-like member and the second plate-like member,
   the third plate-like member includes
      a base plate orthogonal to a rotary shaft of the carrier and located between the first plate-like member and the second plate-like member,
      a plurality of stays extended from the base plate and connected to the first plate-like member, and
      a plurality of stays extended from the base plate and connected to the second plate-like member,
   the third plate-like member is molded by folding the stays connected to the first plate-like member and the stays connected to the second plate-like member to the base plate by press working, and
   the stays connected to the first plate-like member and the stays connected to the second plate-like member are fixed by welding.

2. The axle driving device comprising a planet gear mechanism configured to transmit a driving force to a first axle and a second axle via a differential mechanism,
   wherein
   a carrier of the planet gear mechanism includes a first plate-like member, a second plate-like member, and a third plate-like member that connects the first plate-like member and the second plate-like member,
   the third plate-like member includes
      a base plate orthogonal to a rotary shaft of the carrier and located between the first plate-like member and the second plate-like member,
      a plurality of stays extended from the base plate and connected to the first plate-like member, and
      a plurality of stays extended from the base plate and connected to the second plate-like member,
   at least one of support shafts of planetary gears held by the carrier is a stepped shaft having a small diameter part, and
   the small diameter part is exposed between the first plate-like member or the second plate-like member and the third plate-like member.

3. The axle driving device according to claim 1, wherein
   at least one of support shafts of planetary gears held by the carrier is a stepped shaft having a small diameter part, and
   the small diameter part is exposed between the first plate-like member or the second plate-like member and the third plate-like member.

4. A method for assembling an axle driving device in which
   a carrier of a planet gear mechanism includes a first plate-like member, a second plate-like member, and a third plate-like member that connects the first plate-like member and the second plate-like member, and
   the third plate-like member is orthogonal to a rotary shaft of the carrier and located between the first plate-like member and the second plate-like member, and includes
      an annular part provided in an annular shape about the rotary shaft, and
      a plurality of extensions extended from the annular part to the outside and arranged at equal intervals in a circumferential direction about the rotary shaft,
   the method comprising the steps of:
   attaching a first stepped gear between the extensions, with a smaller gear of the first stepped gear facing the first plate-like member;
   attaching a first planetary gear between the first plate-like member and the third plate-like member while causing the first planetary gear to mesh with a larger gear of the first stepped gear;
   attaching a second stepped gear between the extensions while causing a smaller gear of the second stepped gear to mesh with a larger gear of the first stepped gear; and
   attaching a second planetary gear between the second plate-like member and the third plate-like member while causing a second planetary gear to mesh with a smaller gear of the first stepped gear.

* * * * *